(12) United States Patent
Aoshima

(10) Patent No.: US 6,464,416 B1
(45) Date of Patent: Oct. 15, 2002

(54) APPARATUS HAVING CARRIAGE SCANNING MECHANISM, AND RECORDING APPARATUS, INFORMATION RECORDING/REPRODUCING APPARATUS, INFORMATION RECORDING APPARATUS, INFORMATION REPRODUCTION APPARATUS, INFORMATION READING APPARATUS AND INFORMATION ERASING APPARATUS, EACH PROVIDED WITH APPARATUS HAVING CARRIAGE SCANNING MECHANISM

(75) Inventor: Chikara Aoshima, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/492,215

(22) Filed: Jan. 27, 2000

(30) Foreign Application Priority Data

Jan. 26, 1999 (JP) .......................... 11-017394
Jan. 28, 1999 (JP) .......................... 11-020476
Apr. 28, 1999 (JP) .......................... 11-122704

(51) Int. Cl.$^7$ .............................................. B41J 2/315
(52) U.S. Cl. ................... 400/120.01; 400/283; 400/335
(58) Field of Search ................ 400/283, 335, 400/120.01

(56) References Cited

U.S. PATENT DOCUMENTS 4,203,680 A * 5/1980 Mitrovich ................... 400/335
4,376,586 A * 3/1983 Fujisawa .................... 400/229
4,653,948 A * 3/1987 Ikeda .......................... 400/335
5,779,376 A * 7/1998 Seu ............................. 400/335
5,940,106 A * 8/1999 Walker ........................ 347/109

FOREIGN PATENT DOCUMENTS

| JP | 53-82523 | 7/1978 |
| JP | 61-202875 | 9/1986 |
| JP | 7-302307 | 11/1995 |
| JP | 10-169330 | 10/1998 |

OTHER PUBLICATIONS

IBM Technical Disclosure NN77054654, Cable Support System, vol. No. 19, Issue 12, pp. 4654–4658, May 1977.*

\* cited by examiner

Primary Examiner—Andrew H. Hirshfeld
Assistant Examiner—Charles H. Nolan, Jr.
(74) Attorney, Agent, or Firm—Fitzpatrick, Cella, Harper & Scinto

(57) ABSTRACT

An apparatus, which includes a carriage scanning mechanism, can be compactly made and its assembly costs can be reduced. In addition, the drive load can be minimized and a carriage can be precisely driven. The apparatus can be provided in a recording apparatus, an information recording/reproducing apparatus, an information recording apparatus, an information reproduction apparatus, an information reading apparatus and an information erasing apparatus. According to the present invention, each of these apparatuses comprises a carriage provided for performing scanning in a predetermined scanning area, a drive device provided for the carriage, and wire wound around an output unit of the drive device in the predetermined scanning area and extended under tension along a scanning direction of said carriage. The output unit, around which the wire is wound, moves along the wire upon being driven by the drive device to scan the carriage.

36 Claims, 16 Drawing Sheets

APPARATUS HAVING CARRIAGE SCANNING MECHANISM, AND RECORDING APPARATUS, INFORMATION RECORDING/REPRODUCING APPARATUS, INFORMATION RECORDING APPARATUS, INFORMATION REPRODUCTION APPARATUS, INFORMATION READING APPARATUS AND INFORMATION ERASING APPARATUS, EACH PROVIDED WITH APPARATUS HAVING CARRIAGE SCANNING MECHANISM

BACKGROUND OF THE INVENTION

1. Field of the Invention

The present invention relates to an apparatus having a carriage scanning mechanism for reciprocally scanning a carriage, and a recording apparatus, an information recording/reproducing apparatus, an information recording apparatus, an information reproduction apparatus, an information reading apparatus and an information erasing apparatus, provided with the apparatus including the carriage scanning mechanism.

2. Related Background Art

For most of the conventional apparatuses that perform recording/reproducing/reading using a head mounted on a carriage, in synchronization with the reciprocal displacement of the carriage in the main body of the apparatus, a motor fixed to the main body of the apparatus exerts a driving force that is transmitted to the carriage by a timing belt and that reciprocally moves the carriage.

CONVENTIONAL EXAMPLE 1

FIG. 19 is a diagram illustrating the arrangement of a conventional serial recording apparatus.

In FIG. 19, rotatably mounted in an apparatus main body 100 is a paper feed roller 111, which is rotated by a paper feed motor 112, that is employed to feed a recording sheet 113. In order for the recording sheet 113 to be conveyed, follow-up rollers 114 press it against the paper feed roller 111.

Both ends of a guide shaft 103 and an auxiliary guide shaft 105, which are so positioned that they lie perpendicular to the direction in which the recording sheet 113 is conveyed, are fixed to the apparatus main body 100. And securely bonded to a slider 104 and an auxiliary slider 106 that, respectively, slidably engage the guide shaft 103 and the auxiliary guide shaft 105 is a carriage 102 on which recording means 101 is mounted. The recording means 101 is, for example, a type of ink-jet.

A carriage motor 107, which is fixed to the apparatus main body 100 and which has a pulley 108 securely fitted around its output shaft, is located at one end of the guide shaft 103, and an idle pulley 109 is rotatably secured at the other end. And fitted around the idle pulley 109 and the pulley 108 is a timing belt 110, one part of which is fixed to the carriage 102.

In addition, provided for the apparatus main body 100 is a controller 115, which is connected to the carriage motor 107 by a lead line 117 and to the paper feed motor 112 by another lead line (not shown). The controller 115 is also connected by a flexible print board 116 to the recording means 101 that is mounted on the carriage 102. With this arrangement, the controller 115 drives or controls the carriage motor 107, the paper feed motor 112 and the recording means 101.

It should be noted that a stepper motor having at least two phases may be employed as the carriage motor 107 because it provides superior control at a lower cost than does a common direct-current motor.

In Japanese Laid-Open Patent Application No. 53-82523, an apparatus for driving the carriage is disclosed wherein a motor is provided for the main body, and a wire that is fitted around a pulley, which is securely fitted around the output side of the motor, is guided by a rotary pulley that is attached to the main body.

In Japanese Laid-Open Patent Application No. 61-202875, a mechanism is disclosed wherein a motor is attached to a carriage, and is driven by a pinion gear that is fitted around the output shaft of the motor and that engages a rack that is provided for the main body.

CONVENTIONAL EXAMPLE 2

In Japanese Laid-Open Patent Application No. 7-302307 or No. 10-269330, an information recording/reproducing apparatus is disclosed wherein an optical card, which is a card-shaped information recording medium, is mounted on a mounting table that serves as a carriage, and the mounting table is displaced relative to an optical head, which is a recording/reproducing head, so that information recording/reproducing is performed.

The conveying means used for this apparatus employs a transmission system, which includes an endless timing belt that transmits, to the mounting table, the driving force produced by a motor fixed to a main body, that moves the mounting table relative to the optical head. During this process, information recording/reproducing is performed by the optical head. FIG. 20 is a diagram showing the specific arrangement of this conveying means.

In FIG. 20, information recording tracks are formed on an optical card 200 at intervals of several $\mu$m. The optical card 200 is a card-shaped information recording medium for which, to perform information recording/reproducing, a spot having a diameter of several $\mu$m is formed by projecting a light beam between the tracks. The optical card 200 is mounted on a mounting table 201.

A guide shaft 202 is fixed at both ends to the main body, and a slider 203, which is securely bonded to the mounting table 201, slidably engages the guide shaft 202. An auxiliary guide shaft 204 is fixed at both ends to the main body, and is positioned so that it is parallel to the guide shaft 202. An auxiliary slider 205, which is securely bonded to the table 201, slidably engages the auxiliary guide shaft 204.

Further, a motor 206 is fixed to the main body; a pulley 207 is fitted around the output shaft of the motor 206; an idle pulley 208 is rotatably fixed to the main body; and a timing belt 209 that is fitted around the idle pulley 208 and the pulley 207 is partially secured to the table 201. A controller 216 is attached to the main body.

Optical detection devices 210 and 211 are attached to the main body to detect the position of a photointerrupter. Flexible print boards 212 and 213 electrically connect the optical detection devices 210 and 211 to the controller 216. A light shielding plate 214 is integrally formed with the mounting table 201 and detects its position in conjunction with the optical detection devices 210 and 211. And a lead line 215 is used to electrically connect the motor 206 and the controller 216.

The controller 216 drives or controls the motor 206 and the optical detection devices 210 and 211. The motor 206 rotates forward or backward to relatively displace the mounting table 201 and the optical card 200 in the directions indicated by an arrow G. It should be noted that as the motor 206 a two-phase stepper motor is employed because it provides superior control at a lower cost than does a common direct-current motor. To record/reproduce information, a light beam is emitted by an optical head 217.

An apparatus disclosed in Japanese Laid-Open Patent Application No. 10-269330 employs, as a card-shaped information recording medium, an optical card on which an IC chip is mounted. On the mounting table, a power terminal, to which the IC chip on the optical card is connected, is provided that is electrically connected to a controller in the main body by a flexible print board.

CONVENTIONAL EXAMPLE 3

An information recording/reproducing apparatus that records/reproduces information relative to an optical disk comprises: a carriage, which moves in the direction of the diameter of the optical disk; and an optical head, which is mounted on the carriage. While the carriage is being moved, information is recorded on or reproduced from the optical disk. At this time, the position of the carriage is detected by position detection means (not shown), and control is provided for a drive actuator that drives the carriage.

This conveying means includes a lead thread that serves as one of the guide shafts for the carriage, and an internal threaded member that engages the lead thread and is provided in the carriage. To move the carriage, the lead thread is rotated by a motor in the main body.

This process will be specifically explained while referring to FIG. 21. In FIG. 21, an optical disk 300, a carriage 301 and a pickup 302, which serves as an optical head, are provided. The pickup 302 includes a projection light source, a light-receiving device, and a lens for focusing reflected light on the light-receiving device (none of these are shown).

A guide shaft 303, which is fixed at both ends to the main body, is slidably engaged by a slider 304, while a motor 305 is fixed to the main body and a pinion gear 306 is fitted around the output shaft of the motor 305. A threaded lead shaft 307 is rotatably attached to the main body, and a lead thread 307A on this shaft 307 engages an internal threaded member 301A in the carriage 301, while a gear 307B engages the pinion gear 306.

One end of a leaf spring 308 is securely bonded to the carriage 301 while the other end contacts and pushes against, using its own flexible force, the lead thread 307A of the threaded lead shaft 307 to remove the wobbling that occurs between the internal threaded member 301A of the carriage and the lead thread 307A. A controller 309, which is provided for the main body, is connected to the pickup 302 by a flexible print board 311 and drives or controls the motor 305 and the pickup 302.

As the motor 305 rotates forward or backward, the carriage 301 and the pickup 302 are moved along the face of the optical disk 300 in the directions indicated by an arrow G. It should be noted that a two-phase stepped motor is employed as the motor 305 because it provides superior control at a lower cost than does an ordinary direct-current motor.

However, in the serial recording apparatus in conventional example 1, the carriage motor 107 and the recording means 101 must be independently connected to the controller 115 electrically, and in this case the joint portion will become larger or the assembling costs will be increased. Further, since the timing belt 110 is formed as a ring and the space it encloses can not be used, it will interfere with efforts made to reduce the size of the apparatus.

In order to precisely drive the recording means 101 and the carriage 102, greater tension must be applied to the timing belt 110, and accordingly, the driving load will be increased. In addition, due to the increased load, side pressure will be applied to the output shaft of the motor, and the durability of the motor will be adversely affected.

Since, in the apparatus disclosed in Japanese Laid-Open Patent Application No. 53-82523, the motor is provided for the main body and the wire is fitted around the pulley that is securely bonded to the output shaft of the motor, an increase in the tension applied to the wire is required in order to cope with the drive load represented by the carriage. And when the strength of the tension applied to the wire is increased, a greater side pressure will be placed on the rotary pulley that is provided for the main body for guiding the wire, so that the friction at the rotating portion of the rotary pulley, i.e., at the portion attached to the main body, will be increased, as will the drive load. The durability of the rotary pulley will also be adversely affected, and additional parts will be needed and manufacturing costs will rise.

In the mechanism disclosed in Japanese Laid-Open Patent Application No. 61-202875, since the motor is provided on the carriage side, deterioration of the precision of the carriage positioning will occur due to the backlash produced between the rack and the pinion gear that is fitted around the output shaft of the motor. So long as deceleration of the motor is performed by a speed reduction mechanism, the backlash at the initial stage does not adversely affect the precision of the carriage positioning; however, the backlash at the last stage, i.e., near the rack, causes the precision with which the carriage is positioned to be greatly deteriorated. In order to eliminate the backlash, pressure must be applied to the pinion gear and the rack by some means in order to employ only one side for the engagement of the gear. As a result, the apparatus becomes complicated, and an increase in the load due to the pressure that is applied cannot be avoided. There is a method for driving the carriage using a lead thread instead of the rack and pinion gear, but to provide better precision for the positioning of the carriage, pressure must also be applied to the lead thread by some means in order to remove the gap at the lead screw, and an increase in the load cannot be avoided. Further, if a long rack and a long lead thread are employed, their manufacture is difficult, and the costs are increased.

In the conveying means of the information recording/reproducing apparatus in conventional example 2, the motor 206 and the optical detection means 210 and 211 must be independently, electrically connected to the controller 216, so that the connection joint becomes enlarged, and the assembly costs are increased. The timing belt 209 that is fitted around the pulleys 207 and 208 is shaped like a ring, and the space it encloses cannot be employed. Therefore, this will interfere with an effort made to reduce the size of the apparatus.

Since in order to accurately drive the mounting table 201, the timing belt should not be loose, considerable tension must be applied to the belt, and this increases the drive load. Especially because of side pressure due to the tension applied to the output shaft of the motor, durability of the motor is also adversely affected.

Furthermore, in the conveying means (the pickup feeding means) of the information recording/reproducing apparatus in conventional example 3, the motor and the pickup must be independently, electrically connected to the controller 309, so that the connection joint will be enlarged, and the assembly costs will be increased. And since the lead thread should be straight and uncurved, to prevent deformation, the diameter of a long lead thread must be increased, which in turn will lead to an increase in manufacturing costs and will interfere with an attempt to reduce the size of the apparatus. In addition, since to accurately drive the pickup and the carriage a greater pressure must be applied by the leaf spring, the driving load will be increased due friction induced resistance, and much damage due to friction will occur.

SUMMARY OF THE INVENTION

It is, therefore, one objective of the present invention to provide an apparatus, which includes a carriage scanning mechanism, that can be compactly made and for which assembly costs can be reduced, the drive load can be minimized and a carriage can be precisely driven, and to provide for the apparatus a recording apparatus, an information recording/reproducing apparatus, an information recording apparatus, an information reproduction apparatus, an information reading apparatus and an information erasing apparatus.

It is another objective of the present invention to provide an apparatus, which includes a carriage scanning mechanism, comprising:

a carriage capable of scanning in a predetermined scanning area;

drive means provided for the carriage; and wire wound around an output unit of the drive means in the predetermined scanning area and extended under tension along a scanning direction of said carriage, wherein the output unit around which the wire is wound moves along the wire upon scanning of the carriage is driven by the scanning drive means;

and to provide for the apparatus a recording apparatus, an information recording/reproducing apparatus, an information recording apparatus, an information reproduction apparatus, an information reading apparatus and an information erasing apparatus.

It is an additional objective of the present invention to provide an apparatus, which includes a carriage scanning mechanism, comprising:

a carriage capable of scanning in a predetermined scanning area;

drive means provided for the carriage, the drive means including at the least a motor and a rotary member to be driven by the motor; and wire wound around an output unit of the drive means in the predetermined scanning area and extended under tension along a scanning direction of said carriage, wherein the wire encircles the rotary member integer times;

and to provide for the apparatus a recording apparatus, an information recording/reproducing apparatus, an information recording apparatus, an information reproduction apparatus, an information reading apparatus and an information erasing apparatus.

It is further objective of the present invention to provide an apparatus, which includes a carriage scanning mechanism, comprising:

a carriage capable of scanning in a predetermined scanning area;

drive means provided for the carriage, the drive means including at the least a motor and a rotary member to be driven by the motor; and wire wound around an output unit of the drive means in the predetermined scanning area and extended under tension along a scanning direction of said carriage, wherein the wire is wound around the rotary member a predetermined number of times, and the ends of the wire are extended in opposite directions;

and to provide for the apparatus a recording apparatus, an information recording/reproducing apparatus, an information recording apparatus, an information reproduction apparatus, an information reading apparatus and an information erasing apparatus.

It is one more objective of the present invention to provide an apparatus, which includes a carriage scanning mechanism, comprising:

a carriage capable of scanning in a predetermined scanning area;

drive means provided for the carriage; and wire wound around an output unit of the drive means in the predetermined scanning area and extended under tension along a scanning direction of said carriage, wherein, during the scanning performed by the carriage, the wire substantially does not move in the direction in which the carriage is moving;

and to provide for the apparatus a recording apparatus, an information recording/reproducing apparatus, an information recording apparatus, an information reproduction apparatus, an information reading apparatus and an information erasing apparatus.

DETAILED DESCRIPTION OF THE PREFERRED EMBODIMENTS

The preferred embodiments of the present invention will now be described while referring to the accompanying drawings.

First Embodiment

Figure 1:
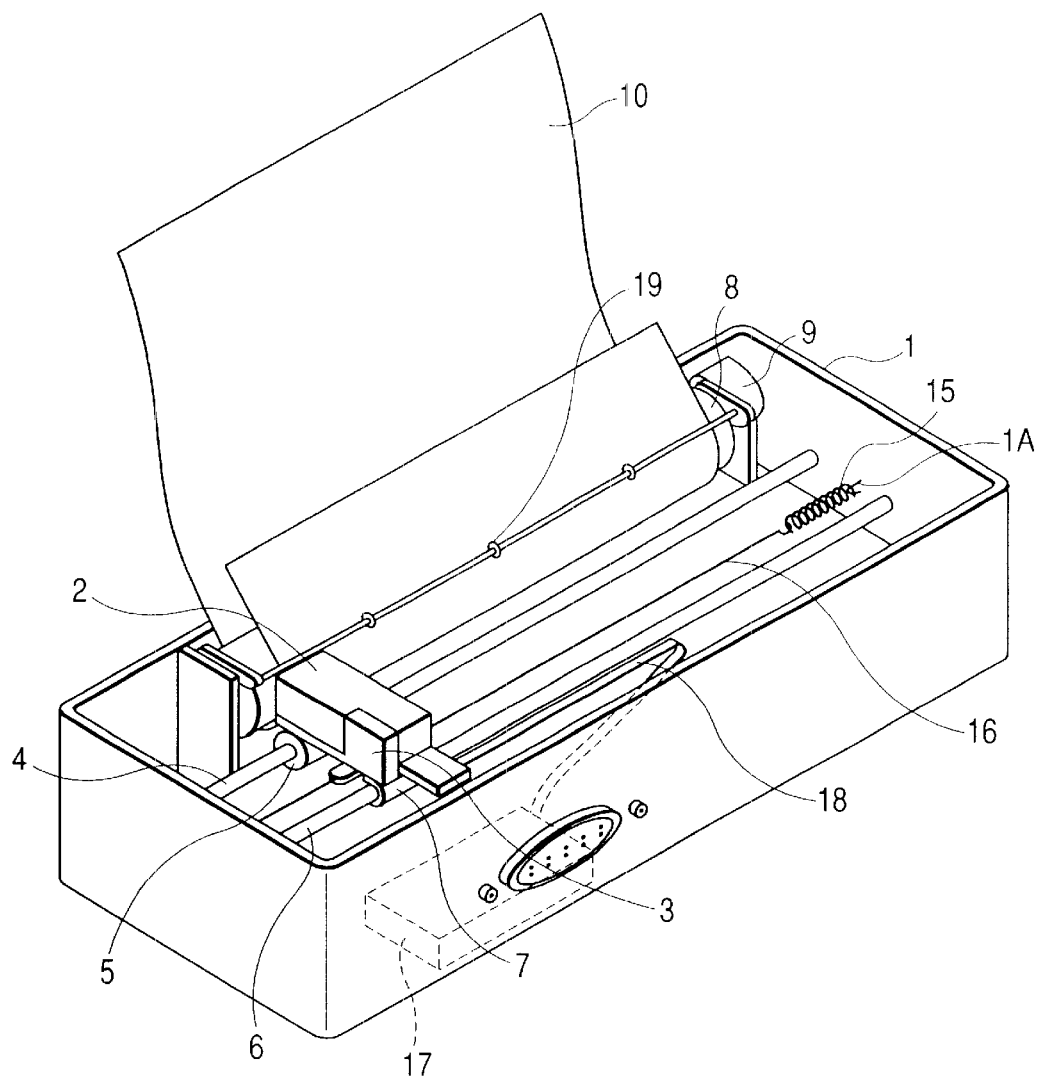
FIG. 1 is a diagram illustrating the external appearance of a serial recording apparatus according to a first embodiment of the present invention.
Figure 2:
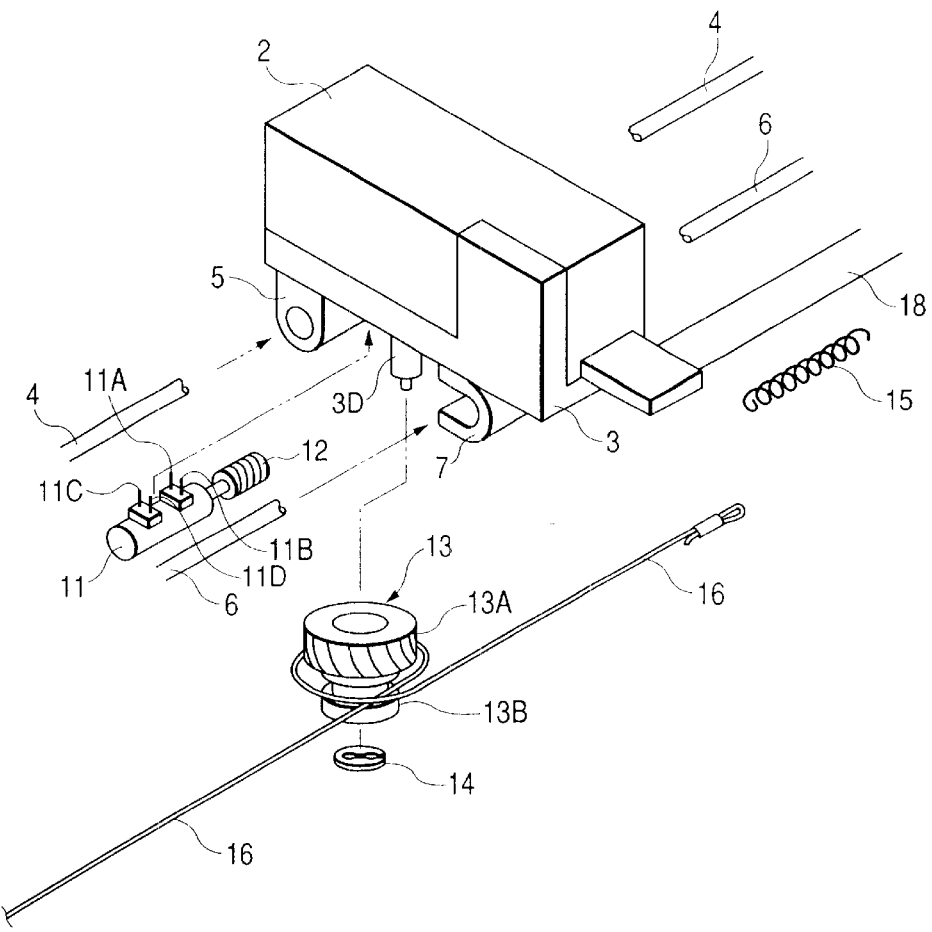
FIG. 2 is an exploded, perspective view of the essential components of the serial recording apparatus according to the first embodiment of the present invention.
Figure 3:
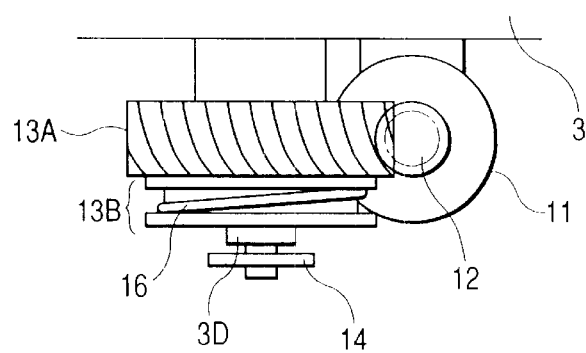
FIG. 3 is a side view of a carriage and a drive unit in the serial recording apparatus according to the embodiment of the present invention.
Figure 4:
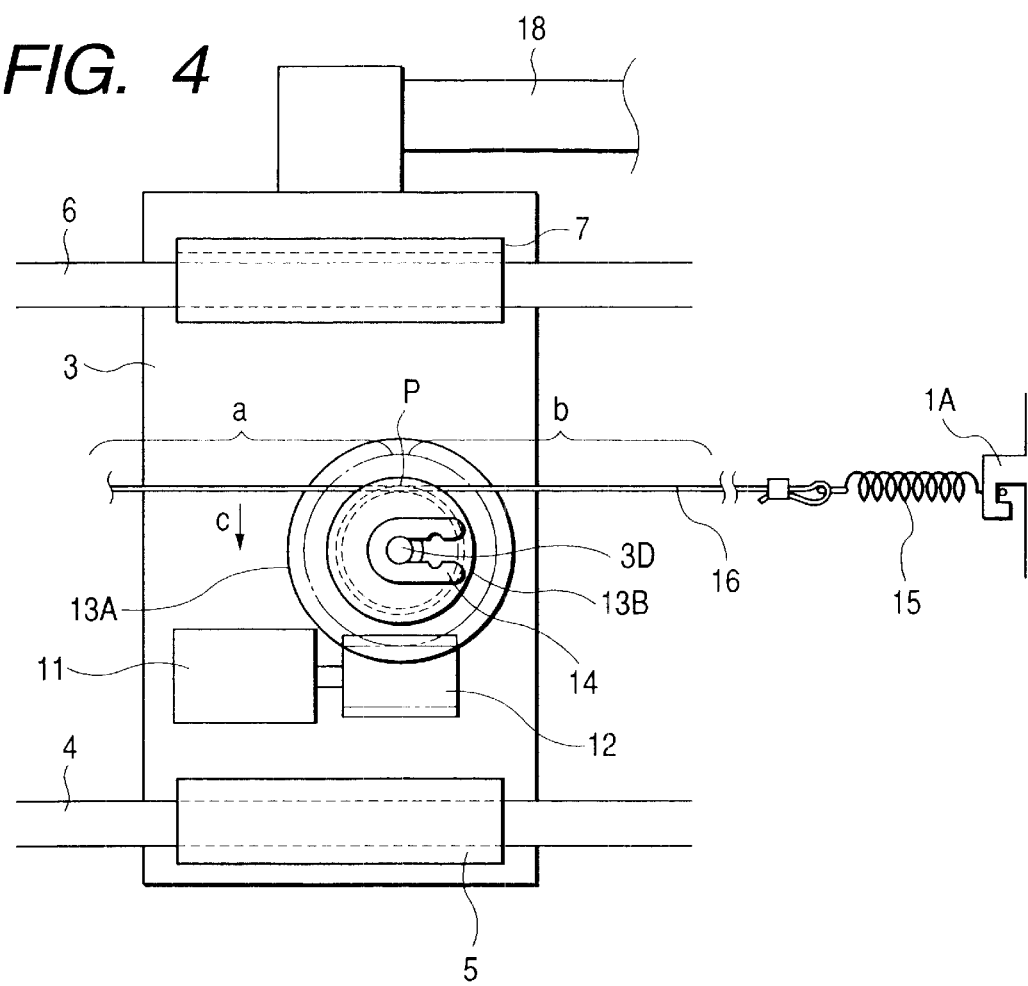
FIG. 4 is a bottom plan view of the carriage and the drive unit of the serial recording apparatus according to the first embodiment of the present invention.

FIG. 1 is a diagram illustrating the external appearance of a serial recording apparatus according to a first embodiment of the present invention; FIG. 2 is an exploded perspective view of the essential components of the first embodiment; FIG. 3 is a side view of a carriage and a drive unit in FIG. 2; and FIG. 4 is a bottom plan view of the carriage and the drive unit in FIG. 2.

A paper feed roller 8 is rotatably attached to a main body 1 to convey a recording sheet 10. When it is conveyed, a follow-up roller presses the recording sheet 10 against the paper feed roller 8, which is rotated by a paper feed motor 9.

A guide shaft 4 and an auxiliary guide shaft 6 are disposed so that they are perpendicular to the direction in which the recording sheet 10 is fed, i.e., orthogonally. Both ends of the guide shaft 4 and of the auxiliary guide shaft 6 are fixed to the main body 1. A slider 5 and an auxiliary slider 7 are respectively fitted around the guide shaft 4 and the auxiliary guide shaft 7, and securely bonded to the slider 5 and the auxiliary slider 7 is a carriage 3 on which recording means 2 or image reading means is mounted. The recording means 2 is, for example, an ink-jet recording device, and the image reading means is, for example, a scanner.

At one end of the guide shaft 4 an end of a wire 16 is fixed to the side of the main body 1, and at the other end of the guide shaft 4 a hook 1A is fixed to the side of the main body 1. Then, a tension spring 15, which is elastic means, at one end engages the hook 1A, while hooked to its other end is the free end of the wire 16. That is, substantially, both ends of the wire 16 are secured to the main body 1: one end directly, and the other end through the tension spring 15.

As is shown in FIGS. 2, 3 and 4, a carriage motor 11 is fixed to the bottom of the carriage 3, and a shaft 3D is also provided to which a pulley member 13 is fitted. The carriage motor 11 is a two-phase stepped (stepping or stepper) motor, and includes coil terminals 11A, 11B, 11C and 11D. Securely fitted around the output shaft of the carriage motor 11 is a worm gear 12, and securely fitted around the distal end of the output shaft 3D is a stopper member 14 that prevents the pulley member 13 from falling off. The pulley member 13 is constituted by a bevel gear 13A, which engages the worm gear 12, and a pulley 13B.

The wire 16 is wound around the pulley 13B of the pulley member 13, and since, as is shown in FIG. 4, the wire 16 encircles the pulley 13B exactly once, i.e., since the attitude of the wire 16 is horizontal before and after (a and b in FIG. 4) an intersection P at which the wire 16 is wound around the pulley 13B, as regards the pulley 13B, the tension on the wire 16 is not applied as a side pressure to the shaft of the pulley 13B, i.e., is not exerted in the direction indicated by an arrow c. Therefore, the durability of the rotary shaft of the pulley is increased, friction causes little damage to the shaft, and the drive load is reduced. Thus, a small motor can be employed, and reductions both in the size of the apparatus and in power consumption can be implemented. In the apparatus disclosed in Japanese Laid-Open Patent Application No. 53-82523, a wire is wound around a pulley that is securely fitted around the output shaft of a motor provided for the main body, and the driving of a carriage occurs as the wire is guided by the pulley attached to the main body. Therefore, since when the tension placed on the wire is increased, both the side pressure applied by the pulley provided for the main body and the drive load are also increased, a small motor cannot be used. And since, in addition, the wire used in the apparatus occupies a large area, the size of the apparatus is increased.

As one method for preventing the tension placed on the wire from serving as side pressure at the pulley, the middle portion of the wire may be wound around the pulley a predetermined number of times, and the ends extended in directly opposite directions. Further, the middle portion of the wire may be wound around the pulley an integer number of times, and the pulley around which the wire is wound may move along the wire as the carriage is moved by the motor.

Since the wire 16 is secured to the main body 1 through the tension spring 15, which is elastic means, a stable magnitude can be maintained for the tension applied to the wire, and the friction produced between the pulley member 13B and the wire 16 can be stabilized.

A controller 17 is provided for the main body 1 for driving or controlling the carriage motor 11 and the recording means 2. One end of a flexible print board 18 is connected to the controller 17, while the other end is connected to the recording means 2 and the coil terminals of the carriage motor 11. Therefore, the carriage motor 11 is so secured that it can move together with the recording means 2 or the carriage 3. The external face of the carriage motor 11 may be securely bonded to one part of the carriage 3.

With this arrangement, when the carriage motor 11 is driven in accordance with an instruction received from the controller 17, the driving force transmitted through the worm gear 12 and the bevel gear 13A of the pulley member 13 rotates the pulley 13B. Then, in consonance with the friction produced between the wire 16 and the pulley 13B of the pulley member 13, the carriage 3 and the recording means 2 are reciprocally displaced along the guide shaft 4.

As is described above, the wire 16 is wound around the pulley 13B of the pulley member 13 an exact integer number of times, so that at the pulley the tension on the wire 16 does not serve as side pressure, i.e., no pressure is applied in the direction indicated by the arrow c in FIG. 4. Because of this characteristic, the tension produced by the tension spring 15, which is elastic means, can fluctuate widely, so that even when an error occurs during the assembly procedure and the wrong spring is installed, in many cases such an error will produce no deleterious effect. As a result, assembly costs can be reduced.

Furthermore, since the carriage motor 11 and the recording means 2 are both on the carriage 3, the same member, i.e., the flexible print board 18, can be employed for the electrical connection of the coil terminals of the carriage motor 11 with the controller 17 and for the electrical connection of the recording means 2 with the controller 17. These electrical connections can be simultaneously effected even when the same member is not employed. As a result, assembly costs can be reduced, and since the space occupied by the connector is small, the size of the overall apparatus can also be reduced. In addition, since only one flexible print board 18 is required to electrically connect the controller 17 to the carriage motor 11 and the recording means 2, parts costs, such as the cost of a lead line for the carriage motor 11, can be reduced.

Basically, the mechanism of this invention is constituted by only four parts, a motor, a pulley, a wire and a spring; and even when a carriage must move a long distance, the manufacture of this mechanism is not difficult because merely the length of the wire must be changed. Therefore, manufacturing costs are reduced compared with those for the apparatus disclosed in Japanese Laid-Open Patent Application No. 53-82523, wherein the wire is wound around the pulley that is securely fitted around the output shaft of the motor provided for the main body and the carriage is driven as the wire is guided by the rotary pulley attached to the main body, or compared with the manufacturing costs for the mechanism disclosed in Japanese Laid-Open Patent Application No. 61-202875, wherein the carriage is driven when the pinion gear, which is fitted around the output shaft of the motor provided for the carriage, engages the rack that is attached to the main body.

Further, because it provides superior control at a lower cost than does a common direct-current motor, a stepper motor having at least two phases is appropriately employed as an actuator that reciprocally drives the recording means 2 and the carriage 3. For connecting the two-phase stepper motor, coil terminals project outward from its external cylindrical side face Therefore, in this embodiment, as is shown in FIGS. 2, 3 and 4, the stepped motor 11 is integrally formed with the carriage 3, so that a plane whereon the coil terminals 11A, 11B, 11C and 11D of the two-phase stepped motor 11 are disposed is parallel to the flexible print board 18 that is connected to the recording means 2. With this arrangement, the terminals of the stepping motor 11 can be soldered, on the same plane, to the flexible print board 18 connected to the recording means 2. Therefore, an extra load is seldom imposed on the flexible print board 18, the soldering is easy, and failures, such as the cutting of the flexible print board 18, do not occur during the assembly process.

Generally, the coil terminals of the motor 11 project outward from the side face of the cylindrical two-phase stepper motor 11. Therefore, when, as in this embodiment, the stepper motor 11 is integrally formed with the carriage 3, so that the plane whereon the four coil terminals of the two-phase stepper motor 11 are disposed is parallel to the plane across which the carriage 2 is reciprocally displaced, a thin carriage assembly can be formed so long as for the two-phase stepper motor 11 is a relationship L≧D is established between the diameter D and the length L. That is, when the two-phase stepper motor 11, for which the relationship L≧D is established for the diameter D and the length L, is employed as an actuator for reciprocally driving the carriage 3, and when the output shaft of the motor is parallel to the plane across which the carriage 3 is reciprocally driven, the coil terminals projecting from the cylindrical face of the motor can be soldered, on the same plane, to the flexible print board 18 that is connected to the recording means 2. Therefore, an extra load is seldom imposed on the flexible print board 18, soldering is easy, and failures, such as the cutting of the flexible print board 18, rarely occur during the assembly process. In addition, since a thin carriage can be formed, a thin serial recording apparatus can be manufactured.

A two-phase stepping motor 11 that is more appropriate for this mechanism is proposed by the present applicant in Japanese Laid-Open Patent Application No. 9-221666.

This proposed motor is so designed that a cylindrical rotor, which is a permanent magnet, is formed whereon alternate poles are provided at equal intervals in the circumferential direction; that the first coil, the rotor and the second coil are arranged in the named order in the axial direction of the rotor; that the first external pole and the first internal pole that are excited by the first coil are located opposite each other on the external face and on the internal face of the rotor; and that the first external pole and the first internal pole that are excited by the second coil are located opposite each other on the external face and on the internal face of the rotor. The rotary shaft that serves as the rotor shaft is drawn out from the cylindrical permanent magnet.

Since, in the thus arranged motor, the first coil, the rotor and the second coil are sequentially arranged in the axial direction of the rotor, the longitudinal size of the motor, i.e., the size along the output shaft, tends to be extended; however, the motor has a small diameter and a high output.

In this embodiment, since the above described motor is employed, the motor is vertically positioned under the carriage 3, while the thickness of the thin serial recording apparatus is maintained. Assuming that the weight of the carriage and the recording means is approximately 0.15 kg (approximately 150 gf), in conventional example 1, a motor torque of approximately 0.0196 Nm (approximately 200 g.cm) is required to move the carriage at a speed of approximately 18 inch/sec; however, since in this embodiment no side pressure is exerted on the pulley, only a motor torque of approximately 0.00294 Nm (approximately 30 g.cm) is required.

Second Embodiment

Figure 5:
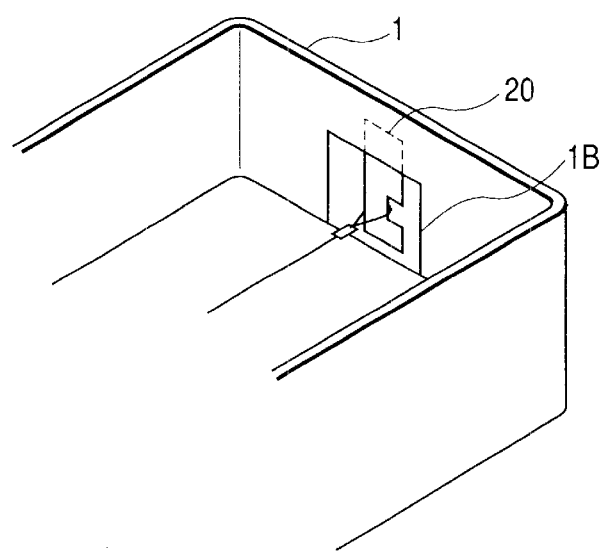
FIG. 5 is a diagram showing an external view according to a second embodiment of the present invention.

FIG. 5 is a diagram illustrating the external appearance for a second embodiment of the present invention.

While in the first embodiment the tension spring 15 is employed to secure the wire 16 to the main body 1, in FIG. 5 a leaf spring 20 is so employed. The leaf spring 20 is fixed by machine screws (not shown) to the external side face of the main body 1, and part of it is projected into an opening 1B in the main body 1. As is shown in FIG. 5, the wire 16 is hooked over the leaf spring 20.

As one method for preventing the tension of the wire 16 from being exerted as side pressure on the pulley, the middle portion of the wire may be wound around the pulley a predetermined number of times, and the two ends of the wire may be extended in directly opposite directions. Further, the middle portion of the wire may be wound around the pulley an integer number of times, and in addition, the pulley around which the wire is wound may be moved along the wire as the carriage is displaced by the motor.

According to the above described arrangement, the wire 16 is hooked over the leaf spring 20, which is secured to the main body 1 by machine screws, so that connecting the wire 16 is facilitated, and so that the wire is held securely.

Third Embodiment

Figure 6:
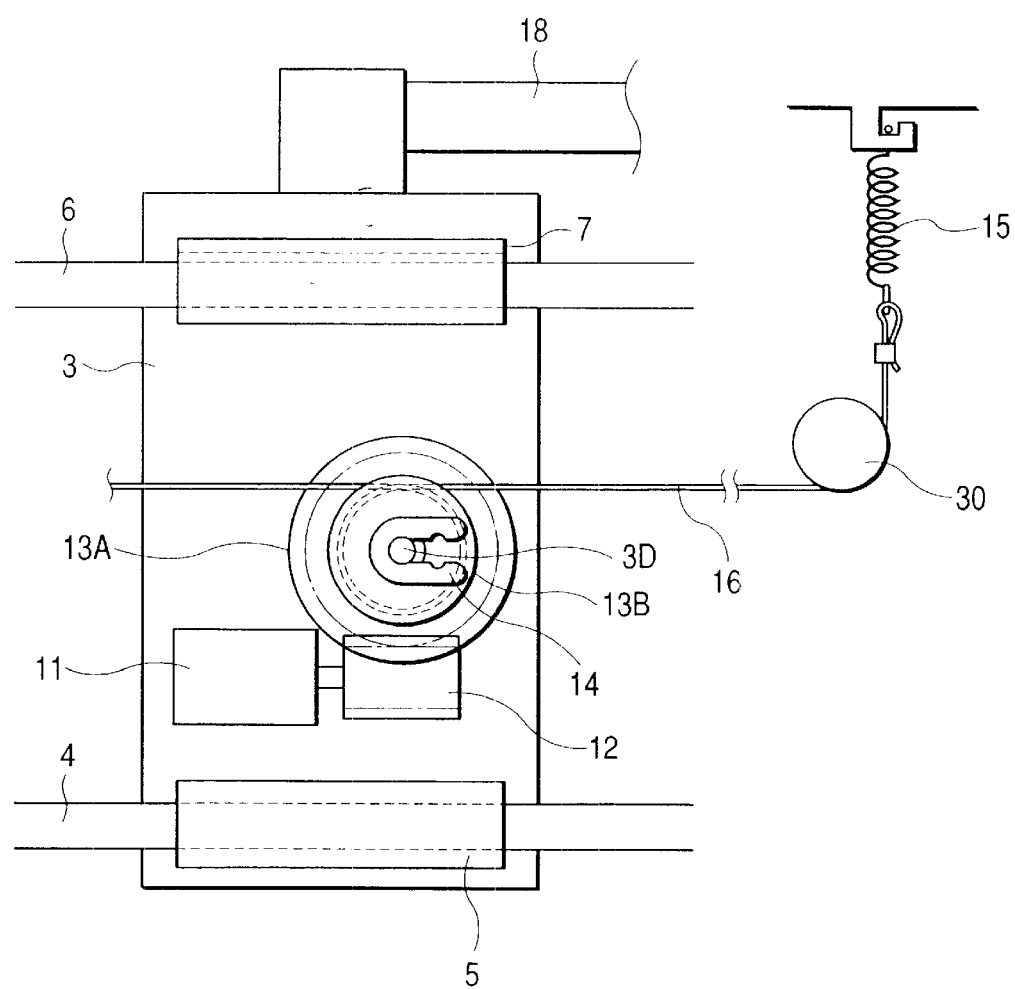
FIG. 6 is a bottom plan view of a carriage and a drive unit according to a third embodiment of the present invention.

FIG. 6 is a bottom plan view of a carriage and a drive unit according to a third embodiment of the present invention.

While in the first embodiment, the tension spring 15 is used to secure one end of the wire 16 to the side of the main body 1, a pulley member can be employed as is shown in FIG. 6. However, the positional relationship existing between a second pulley 30 and the wire 16 is not limited to this embodiment. Since the end portion of the wire 16 that engages the second pulley 30 does not move when the carriage is displaced, the pertinent portion is substantially fixed, even through the pulley member. In addition, the load associated with the displacement of the carriage is not changed. That is, the wire 16 need only be provided so that its end does not move a distance that is equivalent to the displacement of the carriage 3. In this case, the end of the wire 16 may be secured either by a screw or through a pulley.

As a method for preventing the tension on the wire from being applied to the pulley as side pressure, the middle portion of the wire may be wound around the pulley a predetermined number of times and the two ends may be extended in directly opposite directions. Furthermore, the middle portion of the wire may be wound around the pulley an integer number of times, and in addition, the pulley around which the wire is wound may be moved along the wire as the carriage is displaced by the motor.

According to the above described arrangement, since the wire 16 is secured through the pulley member, a certain degree of freedom is permitted in making a determination concerning the positioning and the shape of the wire 16.

Fourth Embodiment

Figure 7:
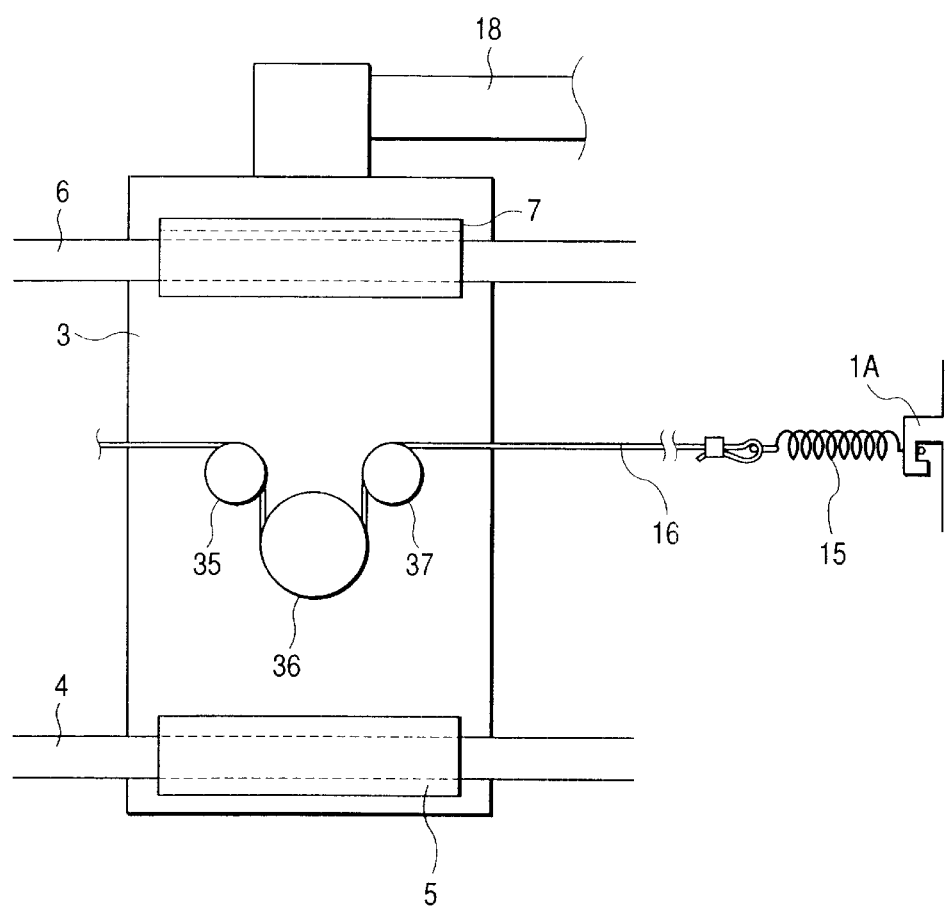
FIG. 7 is a bottom plan view of a carriage and a drive unit according to a fourth embodiment of the present invention.

FIG. 7 is a bottom plan view of a carriage and a drive unit according to a fourth embodiment of the present invention.

While in the first embodiment one pulley member is provided on the reverse face of the carriage 3 and the wire 16 is wound around the pulley member, a plurality of pulley members 35, 36 and 37 may be provided as is shown in FIG. 7, in which it should be noted that no motor is shown.

As a method for preventing the tension on the wire from being applied to the pulley member as side pressure, the middle portion of the wire may be wound around the pulley a predetermined number of times, and the two ends may be extended in directly opposite directions. Furthermore, the middle portion of the wire may be wound around the pulley an integer number of times, and the pulley around which the wire is wound may be moved along the wire as the carriage is displaced by the motor.

According to the above described arrangement, a certain degree of freedom is permitted in making a determination concerning the number of pulley members and the positions at which they are to be fixed.

Fifth Embodiment

Figure 8:
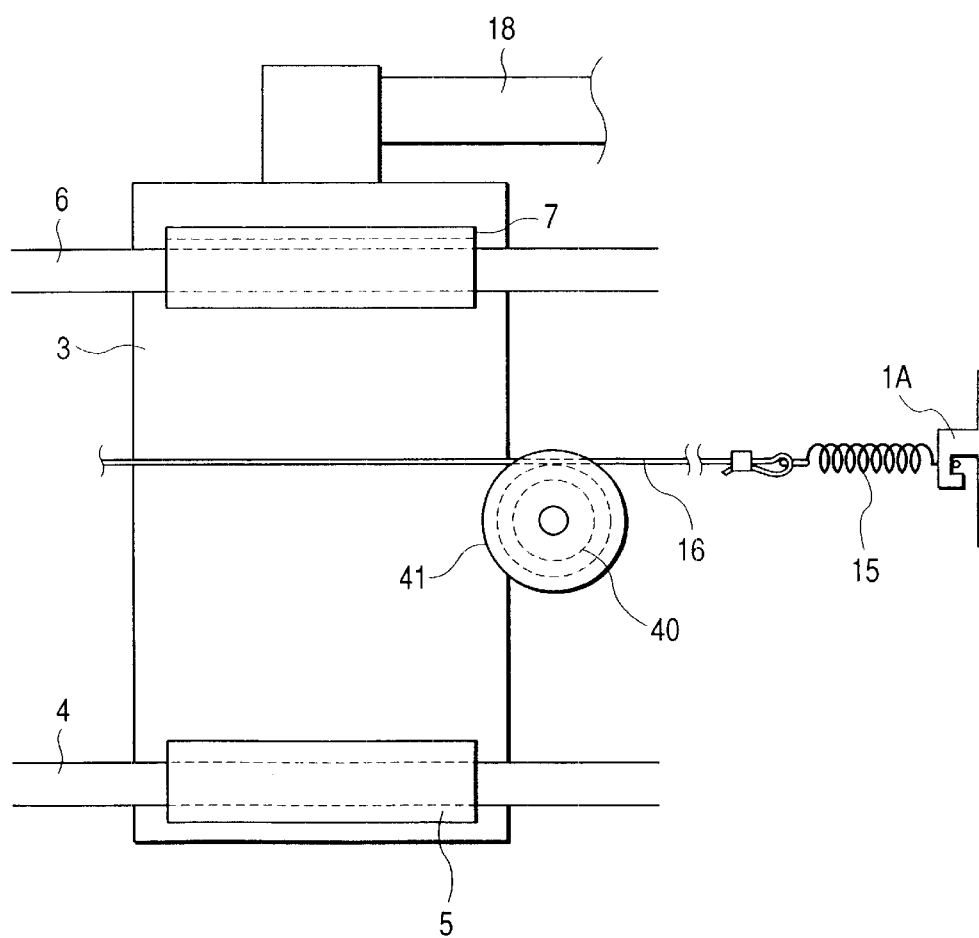
FIG. 8 is a bottom plan view of a carriage and a drive unit according to a fifth embodiment of the present invention.

FIG. 8 is a bottom plan view of a carriage and a drive unit according to a fifth embodiment of the present invention.

While in the first embodiment the carriage motor 11 is fixed to the bottom of the carriage 3, a carriage motor may also be fixed to the side face of the carriage 3, as is shown in FIG. 8.

In FIG. 8, a carriage motor 40 is fixed to the side face of the carriage 3, a pulley member 41 is securely fitted on the shaft of the carriage motor 40, and the wire 16 is wound around the internal diameter portion of the pulley member 41. Since, as in the first embodiment, the wire 16 is wound around the pulley member 41 integer times, i.e., since the attitude of the wire 16 is horizontal before and after an intersection whereat the wire is wound around the pulley member 41, the tension on the wire is not applied to the pulley as side pressure.

As a method for preventing the tension on the wire from being applied to the pulley as side pressure, the middle portion of the wire may be wound around the pulley a predetermined number of times, and the two ends may be extended in directly opposite directions. Furthermore, the middle portion of the wire may be wound around the pulley an integer number of times, and the pulley around which the wire is wound may be moved along the wire as the carriage is displaced by the motor.

According to the above described arrangement, since the carriage motor 40 is fixed to the side face of the carriage 3, and since the pulley member 41 is fitted around the shaft of the carriage motor 40, a worm gear is not required and the wire 16 can be driven directly by the carriage motor 40. Thus, a satisfactory feeding precision is provided for the carriage 3.

Sixth Embodiment

Figure 9:
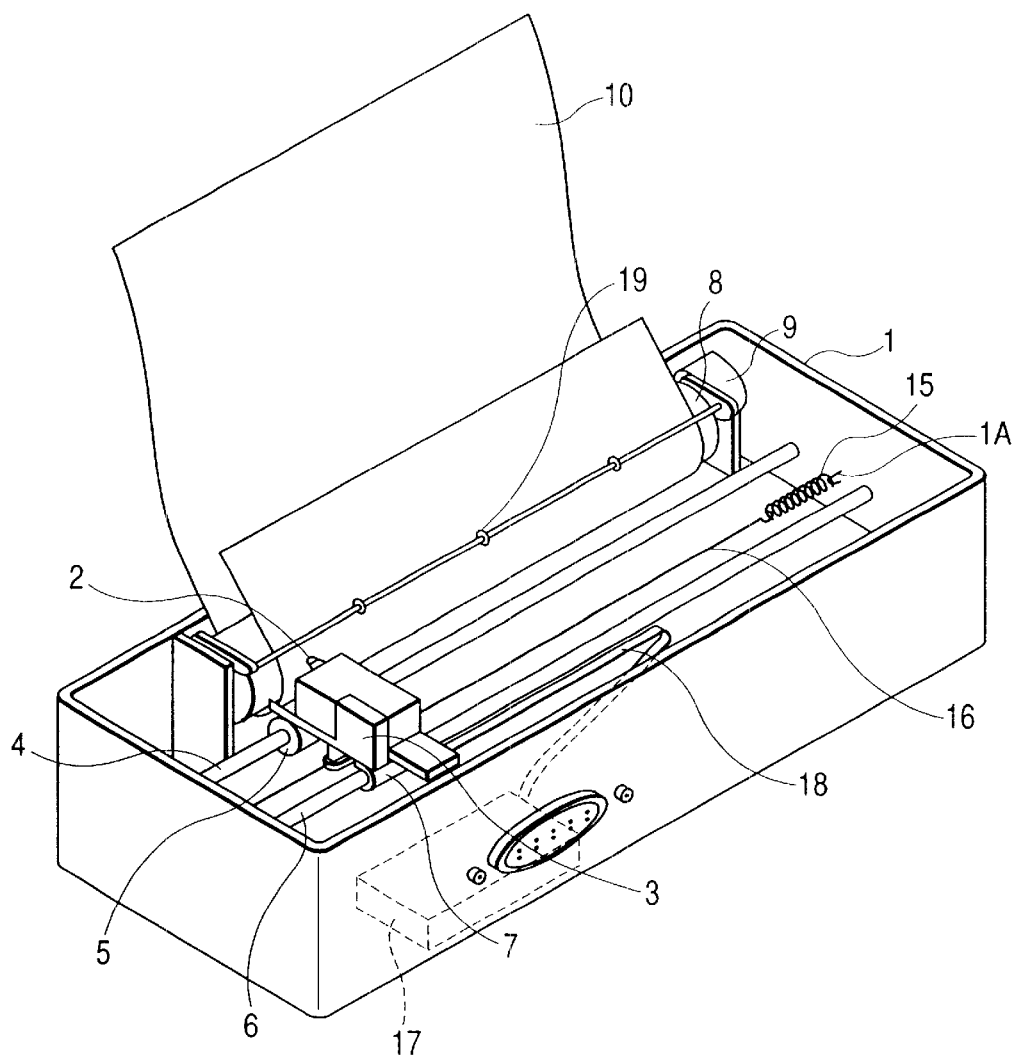
FIG. 9 is a diagram illustrating the external appearance of a serial recording apparatus according to a sixth embodiment of the present invention.

The present invention can be applied not only for a serial recording apparatus as in the first embodiment, which employs, for example, a type of ink-jet as recording means, but also for a pen recorder that employs a pen as recording means. That is, the present invention provides the same effects for a pen recorder for which a pen is employed as recording means. This example is shown in FIG. 9.

As a method for preventing the tension on the wire from being applied to the pulley as side pressure, the middle portion of the wire may be wound around the pulley a predetermined number of times, and the two ends may be extended in directly opposite directions. Furthermore, the middle portion of the wire may be wound around the pulley an integer number of times, and the pulley around which the wire is wound may be moved along the wire as the carriage is displaced by the motor.

Seventh Embodiment

Figure 10:
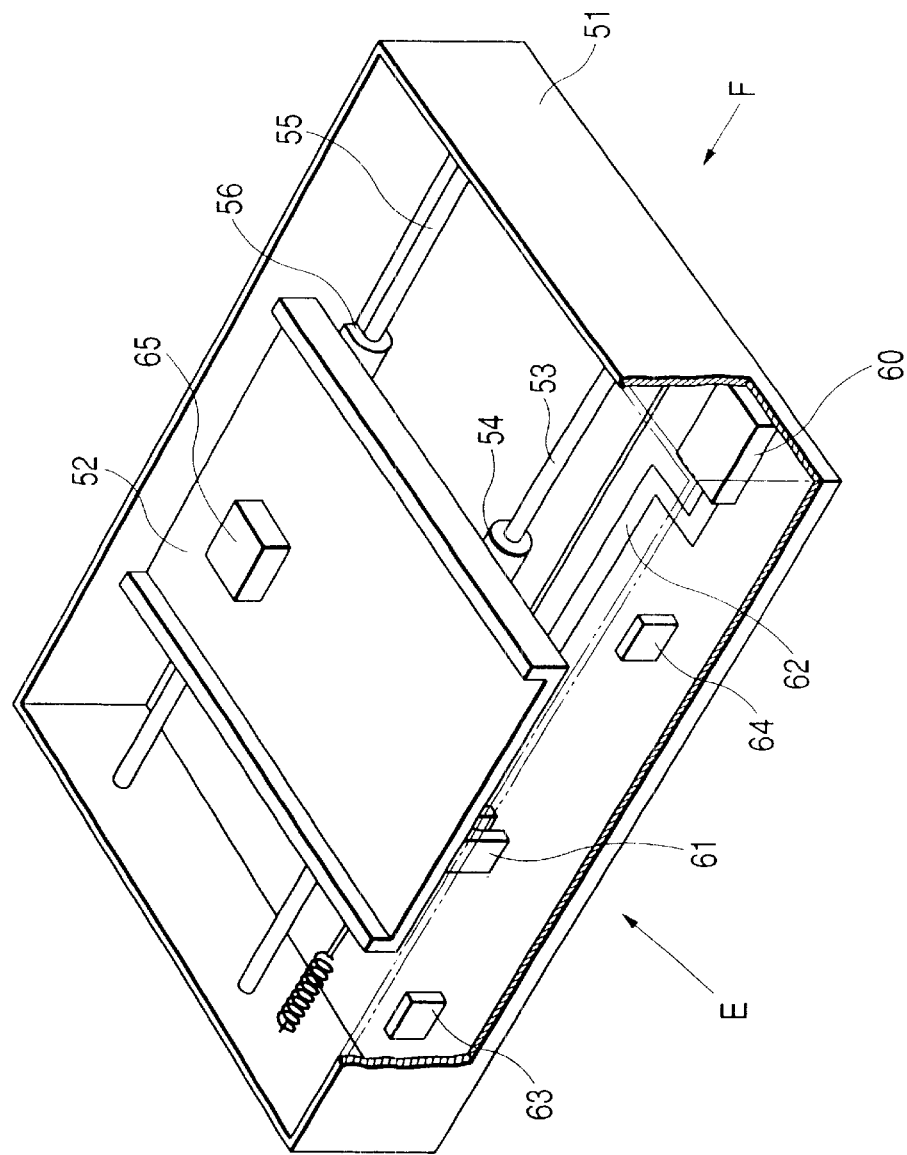
FIG. 10 is a diagram showing an external view according to a seventh embodiment of the present invention.
Figure 11:
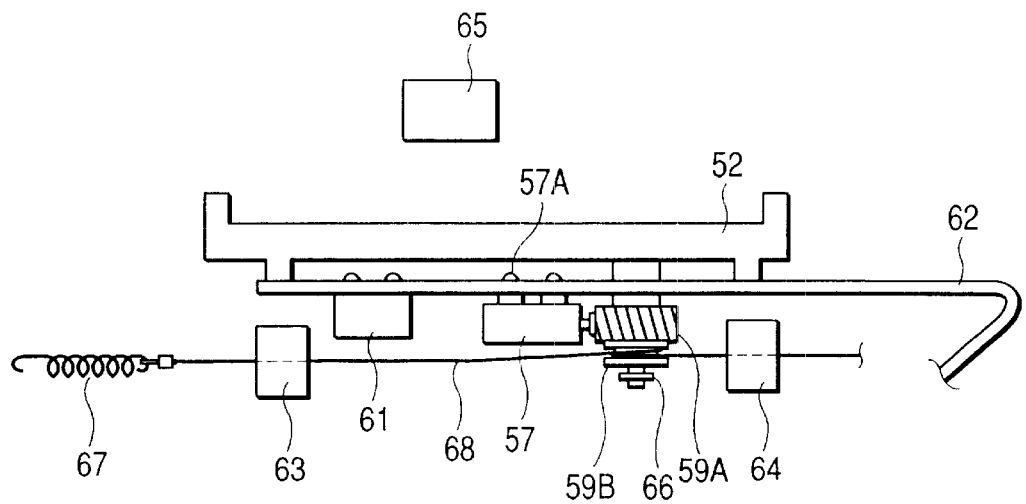
FIG. 11 is a side view of essential components according to the seventh embodiment of the present invention.
Figure 12:
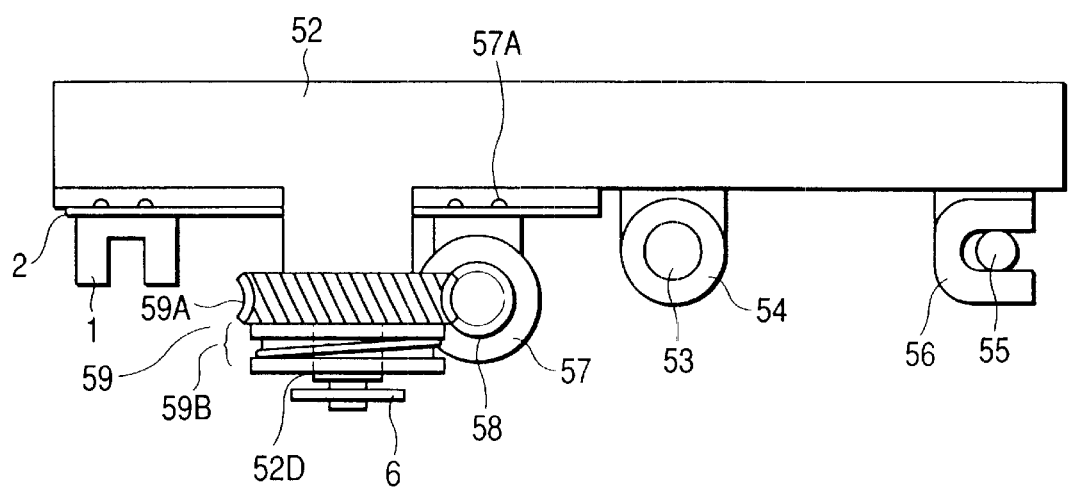
FIG. 12 is a side view of the essential components according to the seventh embodiment of the present invention.
Figure 13:
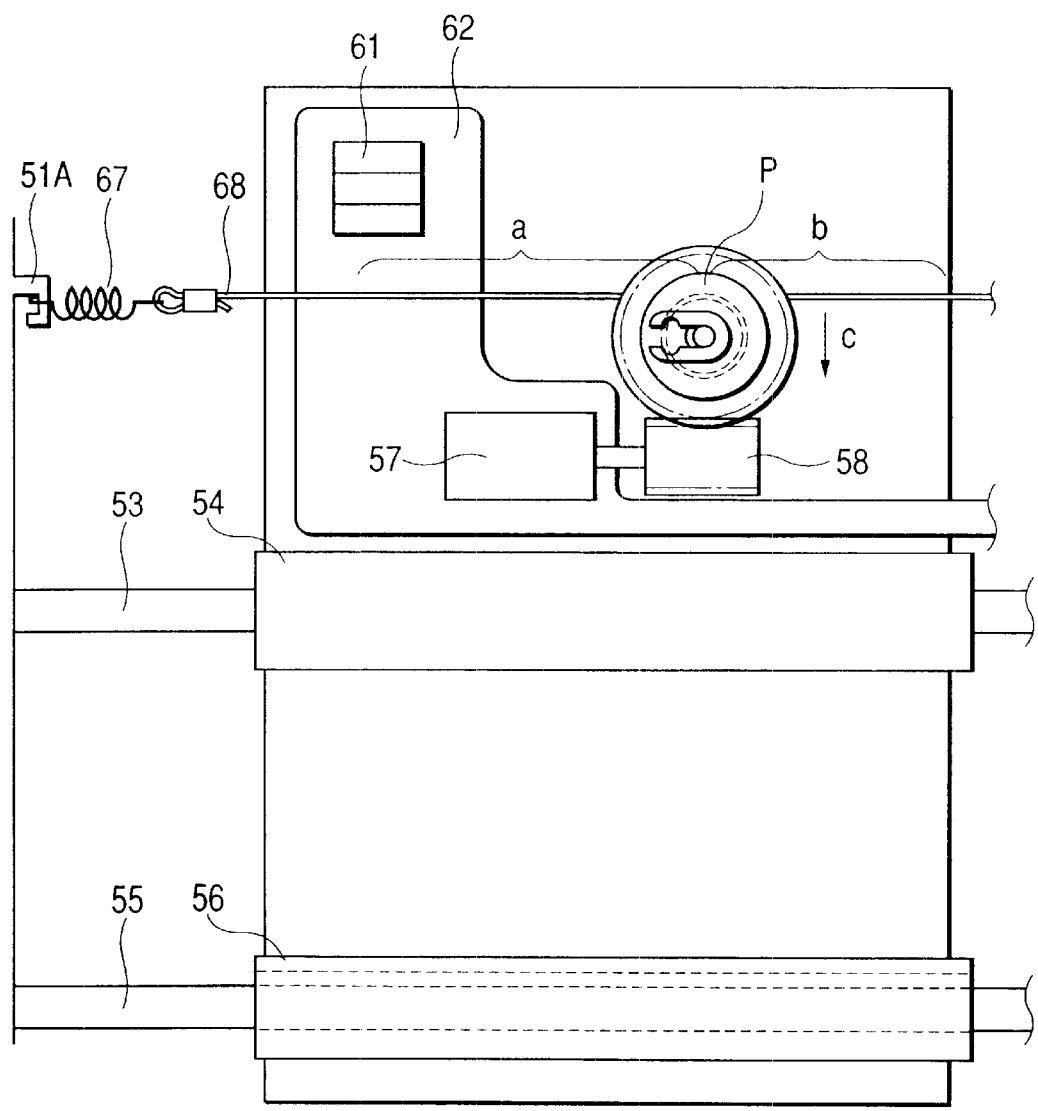
FIG. 13 is a bottom plan view of a drive unit according to the seventh embodiment of the present invention.

FIGS. 10 and 13 are diagrams illustrating a seventh embodiment of the present invention. FIG. 10 is a partially cutaway diagram showing an external view; FIG. 11 is a side view of the essential part near a mounting table viewed from the direction indicated by an arrow E in FIG. 10; FIG. 12 is a side view of the essential part near the mounting table viewed from the direction indicated by an arrow F in FIG. 10; and FIG. 13 is a bottom plan view near the mounting table.

In an apparatus main body 51, an optical card (not shown), which is a recording medium, is mounted on a mounting table 52 that serves as a carriage. A guide shaft 53 is fixed at both ends to the apparatus main body 51, and a slider 54 is securely bonded to the table 52 and slidably engages the guide shaft 53. An auxiliary guide shaft 55 is fixed at both ends to the apparatus main body 51, and an auxiliary slider 56 is securely bonded to the table 52 and slidably engages the auxiliary guide shaft 55.

A stepper motor 57 is a two-phase stepper motor, which will be described in detail later, constituting one part of a drive actuator that is secured to the mounting table 52 and that includes coil terminals 57A. A worm gear 58 is securely fitted around the output shaft of the stepper motor 57, and a pulley member 59, which includes a bevel gear 59A, which engages the worm gear 58, and a pulley 59B, is rotatably fitted around a shaft 52D of the mounting table 52. Both components 58 and 59 constitute parts of the drive actuator.

A controller 60 is provided in the apparatus main body 51, and an optical detection device 61, which is a photointerrupter, is attached to the mounting table 52. One end of a flexible print board 62 is connected to the controller 60, and the other end is securely bonded to the mounting table 52 and is electrically connected to the optical detection device 61 and the coil terminal 57A of the stepper motor 57. In this fashion, the motor 57 is secured to the mounting table 52. Its external face may also be fixed to part of the mounting table 52 by using an appropriate bonding means. In this embodiment, the controller 60 drives or controls the motor 57 and the optical detection device 61.

Light shielding plates 63 and 64 are integrally formed with the apparatus main body 51, and interact with the optical detection device 61 to detect the position of the mounting table 52. An optical head 65 is supported by well known means at a position facing the track of an optical card (not shown). A light beam is emitted by the optical head 65 for either recording, reproducing, reading or erasing information on the optical card, or for performing an arbitrarily combined process that employs these functions.

A stopper member 66 is securely fitted around the distal end of the shaft 52D of the mounting table 52 to prevent the pulley member 59 from falling off. A tension spring 67, which serves as elastic means, engages at one end a hook 51A that is an integral part of the apparatus main body 51. One end of a wire 68 is fixed to the apparatus main body 51, and the other end is hooked around the tension spring 67. Thus, both ends of the wire 68 are substantially fixed to the apparatus main body 51, even though at one end this is effected through the tension spring 67.

As is shown in FIGS. 12 and 13, the wire 68 is wound around the pulley 59B of the pulley member 59. Since, as is shown in FIG. 13, the wire is wound around the pulley 59B an exact integer number of times, i.e., since the wire 68 is extended forward and backward (a and b) at an intersection P whereat the wire 68 is wound around the pulley 59B, the tension on the wire 68 is not applied as side pressure to the shaft of the pulley 59B, i.e., is not exerted in the direction indicated by an arrow c. Therefore, the durability of the rotary shaft of the pulley is increased, friction causes little damage to the shaft, and the drive load is reduced. Thus, a small compact motor can be employed, and both the size of the apparatus and the power that is consumed can be reduced.

With this arrangement, when the motor 57 is driven, the driving force is transmitted through the worm gear 58 and the bevel gear 59A of the pulley member 59 and rotates the pulley 59B. Then, in consonance with the friction produced between the wire 68 and the pulley 59B of the pulley member 59, the mounting table 52 is driven in the direction in which it should move (in the scanning direction for the optical head 65).

The pulley member 59 is positioned so that it is rotated across a plane that is parallel to the plane in which the mounting table 52 is moved along the guide shaft 53 and the auxiliary shaft 55. In the above arrangement, since the diameter of the pulley 59B is parallel to the plane in the scanning direction of the optical head 65, an extremely thin main body can be obtained. And as a result, a compact information recording/reproducing apparatus can be provided.

Since the wire 68 is wound around the pulley 59B of the pulley member 59 integer times, the tension on the wire 68 is not applied as side pressure to the shaft of the pulley member 59, i.e., is not exerted in the direction indicated by the arrow c. Because of this characteristic, no problem arises even when the permissible distance that is set for the extension or the compression of the tension spring 67, which is the elastic means, covers a considerably broad range. Therefore, even if an error occurs during the assembly process and the wrong spring is installed, in many cases the error will be absorbed by the above range, so that assembly is facilitated and assembly costs are reduced. The middle portion of the wire may be wound around a predetermined number of times, and the two ends may be extended in directly opposite directions. The pulley around which the wire is wound may then be moved along the wire as the carriage is displaced by the motor. As is described above, since no side pressure is exerted on the pulley, the motor torque can be reduced to approximately ⅕ that required for the conventional example.

Furthermore, since the motor 57 is fixed to the mounting table 52, the same member, i.e., the flexible print board 62, can be employed to electrically connect the coil terminals and an electrical device, such as the optical detection device 61, mounted on the mounting table 52 to the controller 60. Further, even when the same member is not employed for these connections, the connections can be performed as a single process. Therefore, the assembly costs can be further reduced, and the volume of the space occupied by the connector and the overall size of the apparatus can also be reduced.

In addition, since only one flexible print board 62 is required for the electrical connections, the cost of parts, such as a lead line for the motor, is less. In this embodiment, the optical detection device 61 is employed as an electrical device mounted on the mounting table 52; however, a terminal disclosed in Japanese Laid-Open Patent Application No. 10-269330 may be employed that is electrically connected to an IC chip mounted on an optical card.

As an actuator that moves the mounting table 52 in the scanning direction of the optical head 65, a two-phase stepper motor is more appropriate than a common direct-current motor, because it provides superior control at a lower cost. The stepper motor is so designed that the coil terminals are projected outward from the cylindrical external side face.

Therefore, as is shown in FIG. 11, the stepper motor 57 is located below the mounting table 52, so that the plane across which the four coil terminals of the stepper motor 57 are disposed is parallel to the plane across which the mounting table 52 is moved. With this arrangement, the coil terminals of the stepper motor can be soldered, on the same plane, to the flexible print board that is connected to the electrical device mounted on the mounting table. Therefore, an extra load is seldom imposed on the flexible print board, soldering is easy, and failures, such as the cutting of the flexible print board, rarely occur during the assembly process.

Since generally the coil terminals project outward from the side face of the cylindrical two-phase stepper motor, when, as is shown in FIG. 11, the two-phase stepper motor 57 is mounted on the mounting table 52, so that the plane across which the four coil terminals of the stepper motor 57 are disposed is parallel to the plane where the mounting table 52 is moved, the stepper motor for which the relationship of $L \geq D$ is established for the diameter D and the length L need only be employed to provide a thin apparatus.

Since the above described motor is employed for this embodiment, the stepper motor is vertically positioned under the mounting table 52. However, by modifying the arrangement, the thickness of the information recording/reproducing apparatus may be applied as the thickness of the above assembly (maintained compact).

Eighth Embodiment

Figure 14:
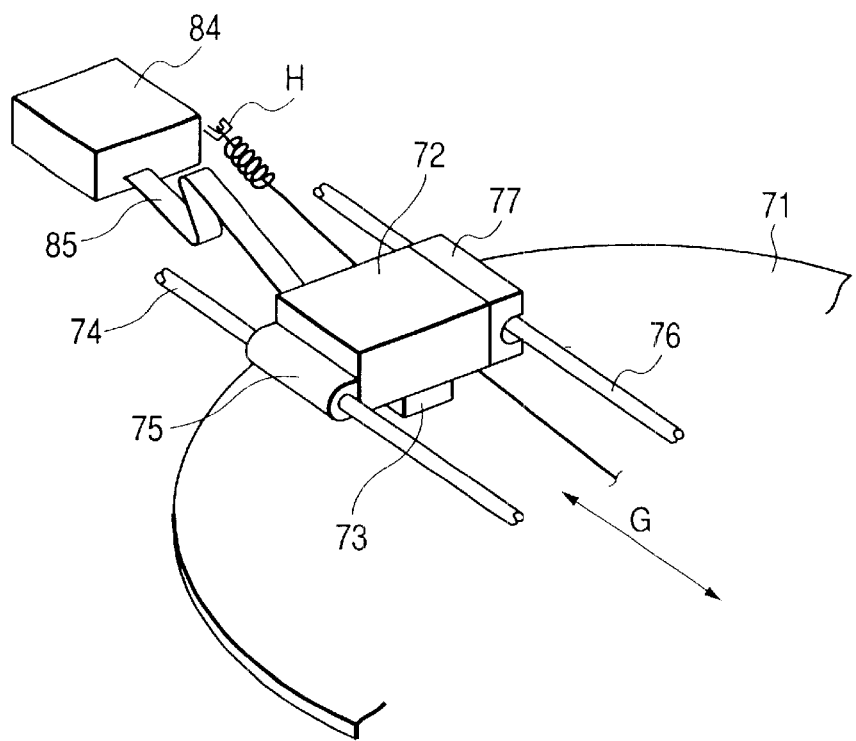
FIG. 14 is a diagram showing an external view according to an eighth embodiment of the present invention.
Figure 16:
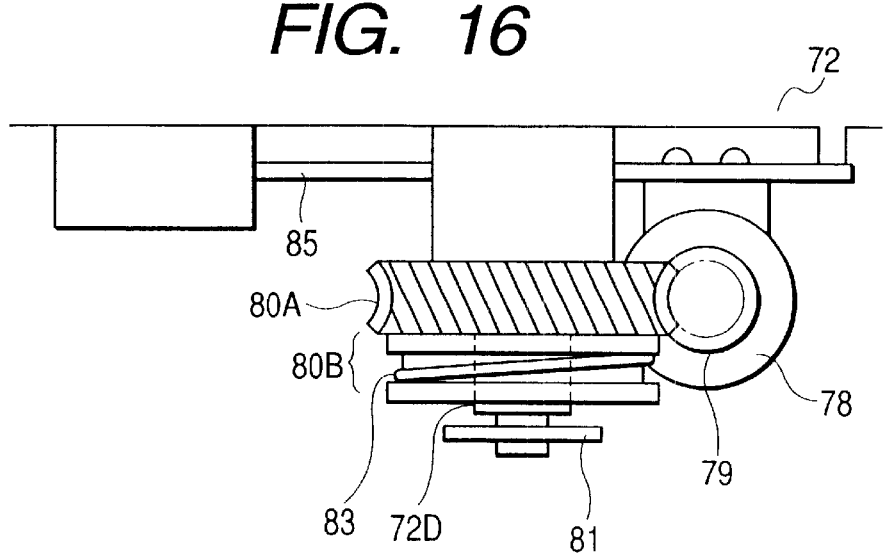
FIG. 16 is a side view of a carriage according to the eighth embodiment of the present invention.
Figure 15:
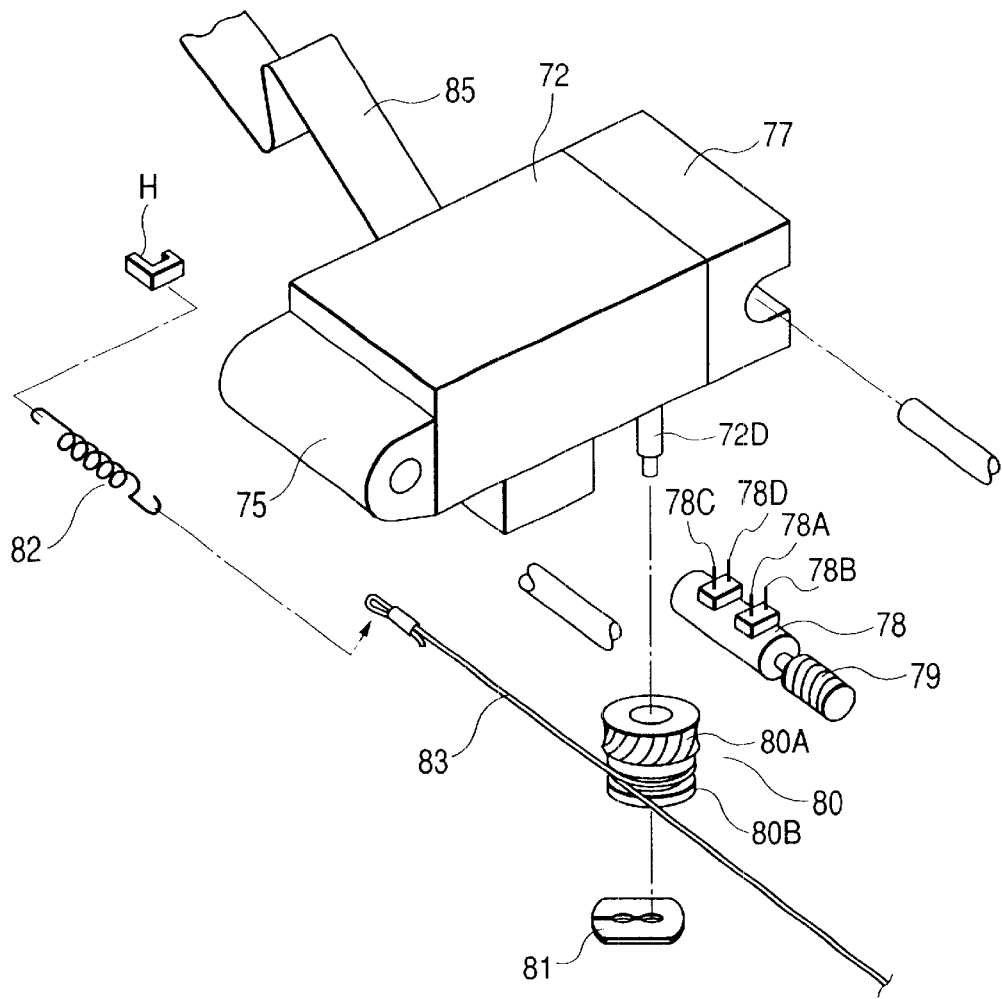
FIG. 15 is an exploded perspective view of essential components according to the eighth embodiment of the present invention.
Figure 17:
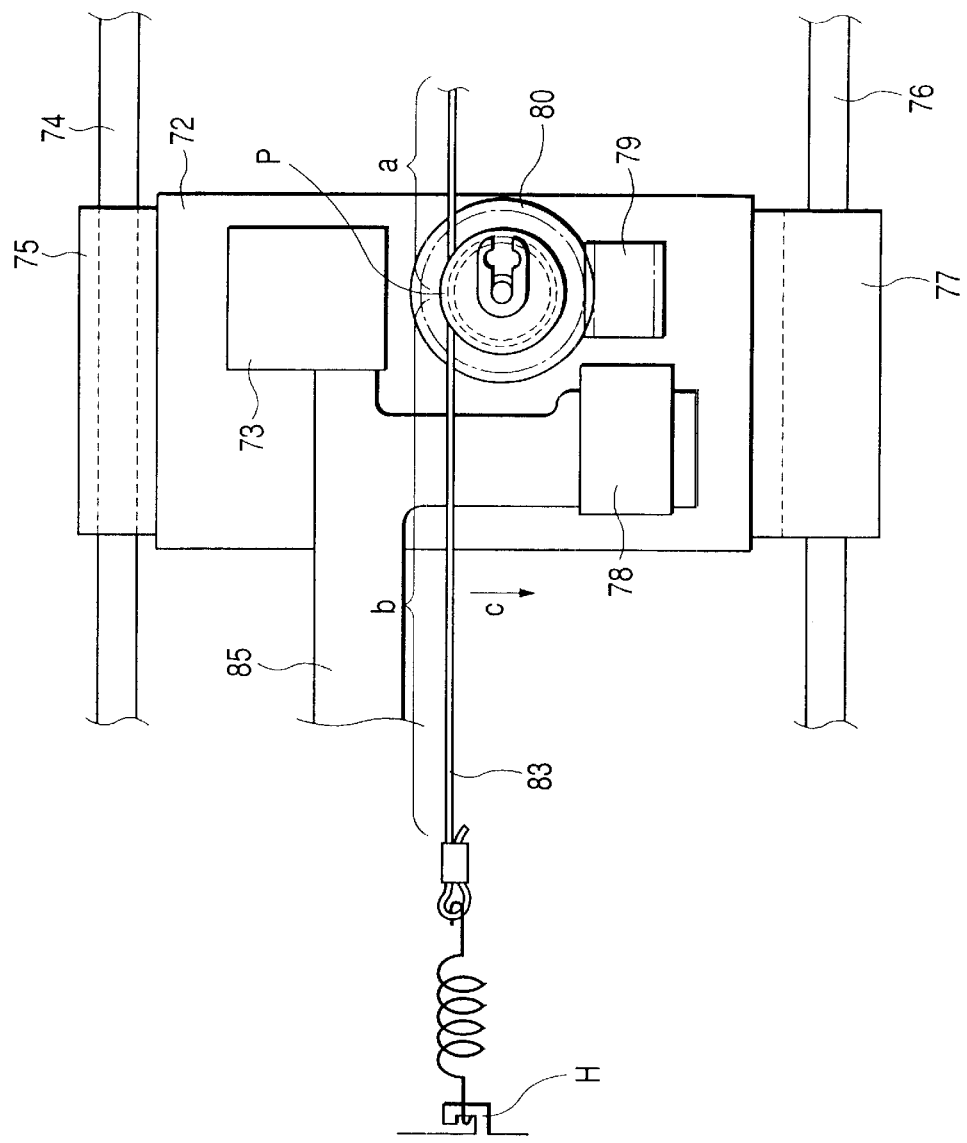
FIG. 17 is a bottom plan view of a drive unit according to the eighth embodiment of the present invention.
Figure 18:
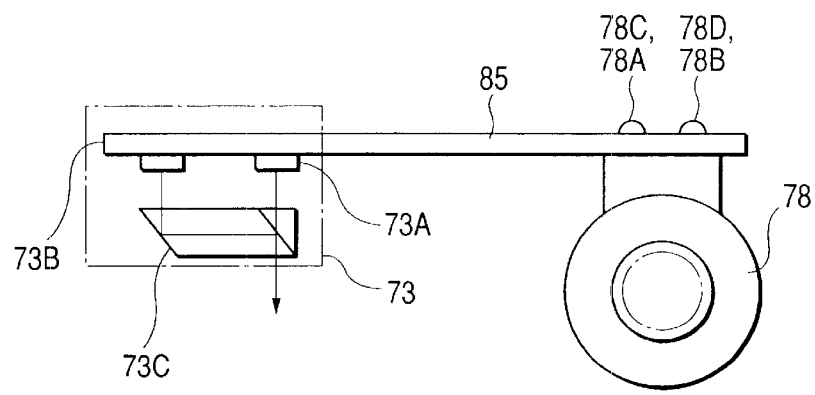
FIG. 18 is a side view showing the positional relationship of a motor, a pickup and a flexible print board according to the eighth embodiment of the present invention.
Figure 20:
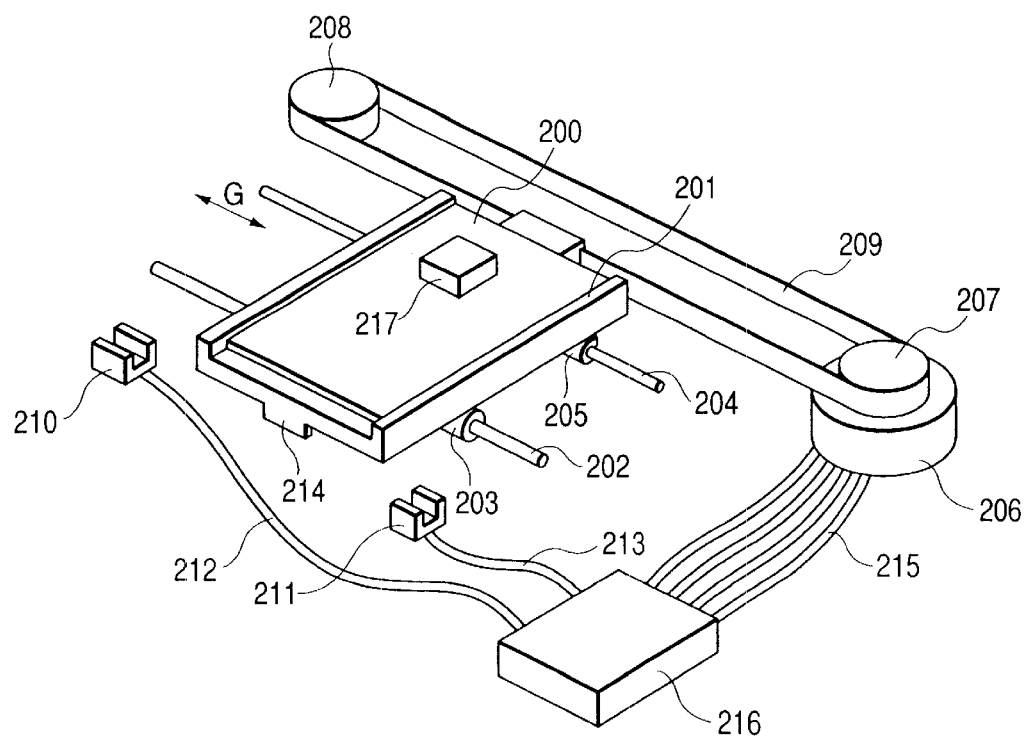
FIG. 20 is a diagram illustrating the external appearance of a second conventional example.
Figure 19:
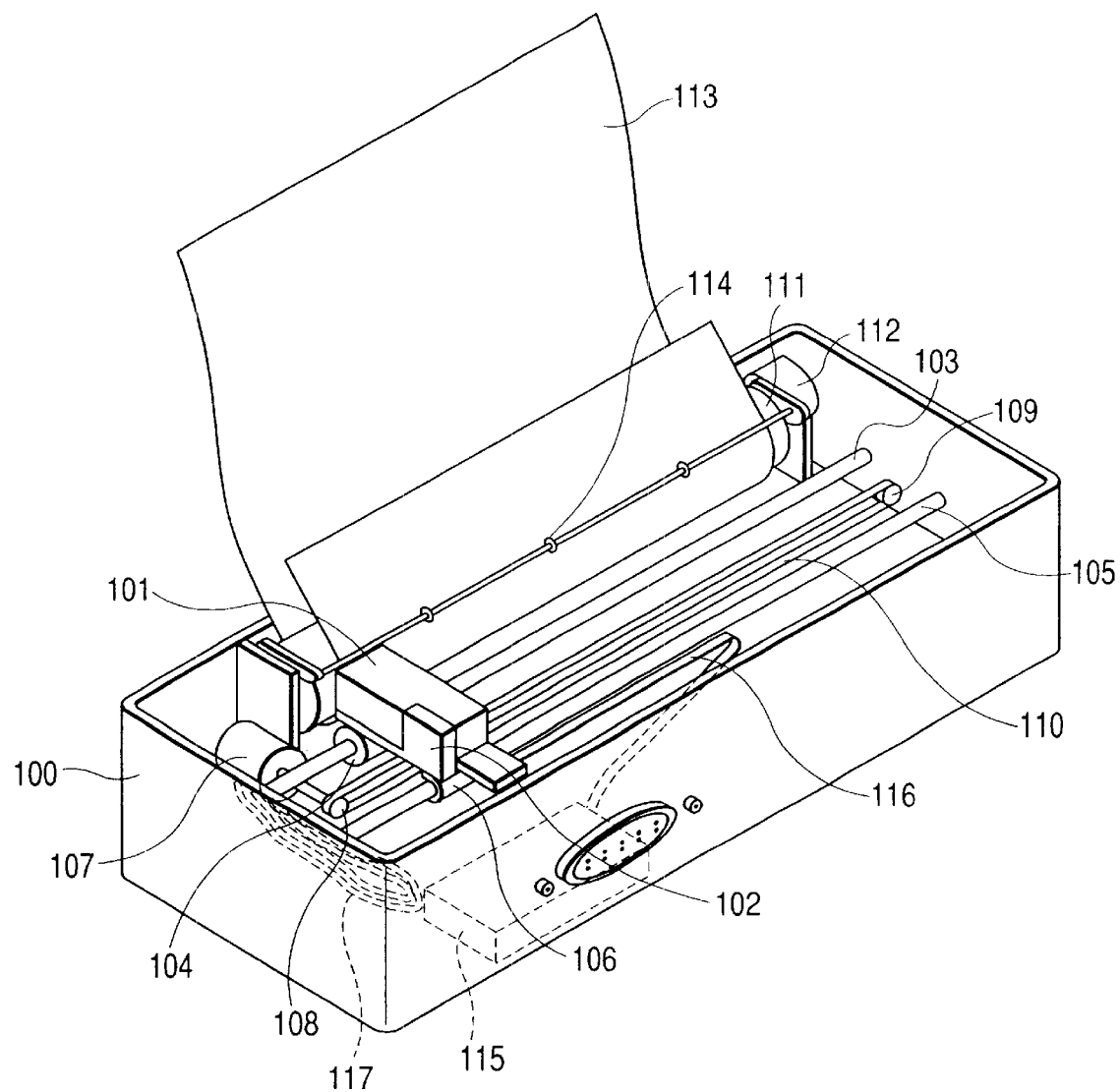
FIG. 19 is a diagram illustrating the external appearance of a first conventional example.
Figure 21:
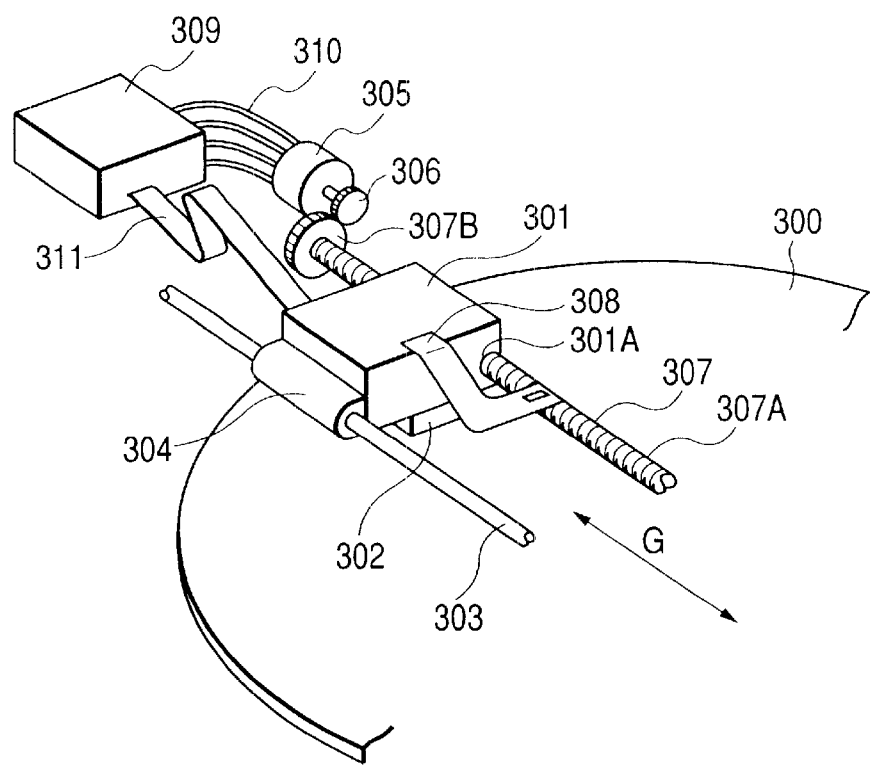
FIG. 21 is a diagram illustrating the external appearance of a third conventional example.

FIGS. 14 to 18 are diagrams for an eighth embodiment of the present invention. FIG. 14 is a diagram showing an external view; FIG. 15 is an exploded perspective view of the essential components; FIG. 16 is a partially cross-sectional side view of information reading means and a motor; FIG. 17 is a side view of a drive unit; and FIG. 18 is a bottom plan view of the drive unit.

Information recording tracks are formed at intervals of several μm on an optical disk 71, which is a disk-shaped information recording medium. When a light beam is formed with a spot diameter of several μm between the tracks, either recording, reproduction, reading or erasing of information, or an arbitrarily combination of these functions, can be performed.

A pickup (optical head) 73, which serves as a recording/reproducing head, is mounted on a carriage 72, and includes a light projection source 73A, such as a semiconductor laser, a light-receiving device 73B and a lens 73C for focusing reflected light onto the light-receiving device 73B.

A guide shaft 74 is securely connected to the carriage 72, and is fixed at both ends to the main body (not shown). A slider 75 is slidably fitted around the guide shaft 74, and an auxiliary guide shaft 76 is fixed at both ends to the main body. A slider 77 is securely bonded to the carriage 72, and is slidably fitted around the auxiliary guide shaft 76. With this arrangement, the carriage 72 and the pickup 73 can be moved along the plane of the optical disk 71 in the direction indicated by an arrow G.

A stepper motor 78, which will be described later in detail, is secured to the carriage 72 and serves as one part of a drive actuator. In this embodiment, a two-phase stepper motor is employed that includes coil terminals 78A, 78B, 78C and 78D. A worm gear 79 is securely fitted around the output shaft of the stepper motor 78. A pulley member 80 that is rotatably fitted around a shaft 72D of the carriage 72 includes a bevel gear 80A, which engages the worm gear 79, and a pulley 80B.

The pulley member 80 is so located that it is rotatable in the plane parallel to the plane across which the carriage 72 and the pickup 73 are moved along the optical disk 71. In this arrangement, since the carriage 72 and the pickup 73 are located in parallel, the size of the pulley 80 along the thickness of the apparatus is not increased, and a compact pickup conveying means (feeding device) can be provided.

A stopper member 81 is securely fitted around the distal end of the shaft 72D of the carriage 72 to prevent the pulley member 80 from falling off. A tension spring 82, which is elastic means, is attached at one end to the hook E on the main body, and one end of wire 83 is fixed to the main body, with the other end being connected to the tension spring 82. Although the wire 83 is connected to the main body through the tension spring 82, it is substantially fixed at both ends to the main body.

A controller 84 is provided for the main body to drive or control the motor 78 and the pickup 73. One end of a flexible print board 85 is connected to the controller 84, and the other end is connected to the pickup 73, especially to the light source 73A, the light-receiving device 73B and the coil terminals of the motor 78. Therefore, the motor 78 is secured to the pickup 73 and the carriage 72. If necessary, the external face of the motor may be fixed to one part of the carriage 72 by bonding means.

As is shown in FIGS. 16 and 17, the wire 83 is wound around the pulley 80B of the pulley member 80. Further, as is shown in FIG. 17, since the wire 83 is extended forward and backward (a and b) at an intersection P whereat the wire 83 is wound around the pulley member 80 integer times, the tension on the wire 83 is not applied to the pulley 80 as side pressure, i.e., pressure is not exerted in the direction indicated by an arrow c. Therefore, the durability of the rotary shaft of the pulley is improved and damage to the shaft due to friction is small, and the drive load is reduced. Therefore, a small motor can be employed, and the size of the apparatus and the power consumption can be reduced. Because of this characteristic, a permissible distance that is set for the extension or the compression of the tension spring 67, which is the elastic means, covers a considerably broad range. Therefore, even if an error occurs during the assembly process and the wrong spring is installed, in many cases the error will be absorbed by the above range, so that assembly costs can be reduced. The middle portion of the wire may be wound around the pulley a predetermined number of times, with the two ends extended in directly opposite directions, and the pulley around which the wire is wound may be moved along the wire as the carriage is displaced by the motor. As is described above, since no side pressure is exerted on the pulley, the motor torque can be reduced to approximately ⅓ that of the conventional example.

In this embodiment, since the wire 83 is fixed to the main body through the tension spring 82, which is elastic means, a stable magnitude of tension can be exerted on the wire 83, and the friction between the pulley 80 and the wire 83 can be stabilized.

With this arrangement, when the motor 78 is driven, the drive force is transmitted through the worm gear 79 and the bevel gear 80A of the pulley member 80 to rotate the pulley 80B. Due to the friction produced between the wire 83 and the pulley 80B of the pulley member 80, the carriage 72 and the pickup 73 are moved across the plane in parallel to the optical disk 71.

Since the motor 78 is fixed to the carriage 72, the same member, i.e., the flexible print board 85, can be employed to connect the coil terminals and the light source 73A and the light-receiving device 73B to the controller 84. But even if the same member is not employed for the electrical connections, these connections can be performed at the same time. Therefore, the assembly costs are reduced, and the volume of the space occupied by the connector and the overall size of the apparatus can also be reduced. Further, since only one flexible print board 85 is required for the electrical connections, the cost of parts, such as a lead line for the motor, is less.

As a drive actuator for driving the carriage 72 and the pickup motor 73 along the optical disk 71, a two-phase stepper motor is more appropriate than a common direct-current motor, because of the superior control it provides and its lower cost. The two-phase stepper motor is so designed that the coil terminals are projected outward from the external cylindrical side face. Therefore, as is shown in FIG. 16, the two-phase stepper motor 78 is located under the carriage 72, so that the plane on which the four coil terminals of the stepper motor 78 are disposed is parallel to the plane across which the carriage 72 and the pickup 73 are moved along the optical disk 71. When the stepper motor is employed for which the relationship of $L \geq D$ is established for the diameter D and length L, a thin apparatus can be provided.

With this arrangement, the coil terminals of the stepper motor 78 can be soldered, on the same plane, to the flexible print board 85 that is connected to the light-receiving device or the light-projecting device of the pickup 73. Therefore, an extra load is seldom imposed to the flexible print board, soldering is easy, and failures, such as the cutting of the flexible print board, rarely occur during the assembly process.

In this embodiment, since the above described motor is employed, it is vertically positioned under the carriage 72. However, by modifying the arrangement, the information recording/reproducing apparatus thickness may be employed as the thickness for the above assembly (compactness of the assembly may be maintained).

In this embodiment, the conveying means is so designed that the rotation portion of the drive actuator is constituted by a pulley, and the wire is wound around the pulley. The rotation portion may also be an internally threaded rotation member (e.g., a nut shaped member) that engages an externally threaded member that may be provided on the main body side parallel to the direction in which the carriage (or the mounting table) is displaced.

As is described above, according to these embodiments, provided are: a carriage for scanning in a predetermined scanning area; drive means for the carriage; and a wire, wound around an output unit of the drive means in the predetermined scanning area, that is extended parallel to the direction in which the carriage performs scanning, so that the output unit, around which the wire is wound, is moved along the wire as the carriage is driven by the scanning drive means. It is therefore possible to provide an apparatus, including a carriage scanning mechanism, for which apparatus assembly costs can be reduced, the apparatus can be compactly made, the drive load can be minimized and a carriage can be precisely driven, and to provide for the apparatus a recording apparatus, an information recording/reproducing apparatus, an information recording apparatus, an information reproduction apparatus, an information reading apparatus and an information erasing apparatus.

What is claimed is:

1. An apparatus having a carriage scanning mechanism, comprising:
   a carriage capable of scanning in a predetermined scanning area;
   a drive source mounted on said carriage and movable with said carriage; and
   wire wound around an output unit of said drive source in the predetermined scanning area and extended under tension along a scanning direction of said carriage,
   wherein said output unit around which said wire is wound moves along said wire upon being driven by said drive source to scan said carriage.

2. An apparatus according to claim 1, wherein one end of said wire is fixed to an apparatus main body through elastic means.

3. An apparatus according to claim 1, wherein, upon scanning of said carriage, a head is displaced relative to a recording medium to perform either recording, reproduction, reading or erasing of information, or an arbitrarily combined function.

4. An apparatus having a carriage scanning mechanism, comprising:
   a carriage capable of scanning in a predetermined scanning area;
   a drive source mounted on said carriage and movable with said carriage, said drive source including at least a motor and a rotary member to be driven by said motor; and
   wire wound around said rotary member of said drive source in the predetermined scanning area and extended under tension along a scanning direction of said carriage, said wire encircling said rotary member an integer number of times.

5. An apparatus according to claim 4, wherein one end of said wire is fixed to an apparatus main body through elastic means.

6. An apparatus according to claim 4, wherein, upon scanning of said carriage, a head is displaced relative to a recording medium to perform either recording, reproduction, reading or erasing of information, or an arbitrarily combined function.

7. An apparatus having a carriage scanning mechanism, comprising:
   a carriage provided for performing scanning in a predetermined scanning area;
   a drive source mounted on said carriage and movable with said carriage, said drive source including at least a motor and a rotary member to be driven by said motor; and
   wire wound around said rotary member of said drive source in the predetermined scanning area and extended under tension along a scanning direction of said carriage, an intermediate portion of said wire encircling said rotary member a predetermined number of times and both ends of said wire extending under tension in opposite directions.

8. An apparatus according to claim 7, wherein one end of said wire is fixed to an apparatus main body through elastic means.

9. An apparatus according to claim 7, wherein, upon scanning of said carriage, a head is displaced relative to a recording medium to perform either recording, reproduction, reading or erasing of information, or an arbitrarily combined function.

10. An apparatus having a carriage scanning mechanism, comprising:
    a carriage provided for performing scanning in a predetermined scanning area;
    a drive source mounted on said carriage and movable with said carriage; and
    wire wound around an output unit of said drive source in the predetermined scanning area and extended under tension along a scanning direction of said carriage, said wire not substantially moving along the scanning direction of said carriage during scanning of said carriage.

11. An apparatus according to claim 10, wherein one end of said wire is fixed to an apparatus main body through elastic means.

12. An apparatus according to claim 10, wherein, upon scanning of said carriage, a head is displaced relative to a recording medium to perform either recording, reproduction, reading or erasing of information, or an arbitrarily combined function.

13. An information recording/reproducing apparatus comprising:
    a carriage capable of scanning in a predetermined scanning area, and constituting a mounting table on which an information recording head is mounted;
    a drive source mounted on said carriage and movable with said carriage; and
    wire wound around an output unit of said drive source in the predetermined scanning area and extended under tension along a scanning direction of said carriage,
    wherein said output unit around which said wire is wound moves along said wire upon being driven by said drive source to scan said carriage.

14. An information recording/reproducing apparatus according to claim 13, further comprising detection means for detecting a position of said carriage, wherein one part of said detection means is mounted on said carriage.

15. An information recording/reproducing apparatus according to claim 14, further comprising:
an electrical circuit that is fixed to an apparatus main body to drive or to control at least said detection means and said drive source; and
a flexible print board, one end of which is connected to said electrical circuit and the other end of which is connected to said detection means and said drive source.

16. An information recording/reproducing apparatus comprising:
a carriage capable of scanning in a predetermined scanning area, and constituting a mounting table on which an information recording head is mounted;
a drive source mounted on said carriage and movable with said carriage, said drive source including at least a motor and a rotary member to be driven by said motor; and
wire wound around said rotary member of said drive source in the predetermined scanning area and extended under tension along a scanning direction of said carriage,
wherein said wire encircles said rotary member an integer number of times.

17. An information recording/reproducing apparatus according to claim 16, further comprising detection means for detecting a position of said carriage, wherein one part of said detection means is mounted on said carriage.

18. An information recording/reproducing apparatus according to claim 17, further comprising:
an electrical circuit that is fixed to an apparatus main body to drive or to control at least said detection means and said drive source; and
a flexible print board, one end of which is connected to said electrical circuit and the other end of which is connected to said detection means and said drive source.

19. An information recording/reproducing apparatus comprising:
a carriage capable of scanning in a predetermined scanning area, and constituting a mounting table on which an information recording head is mounted;
a drive source mounted on said carriage and movable with said carriage, said drive source including at least a motor and a rotary member to be driven by said motor; and
wire wound around said rotary member of said drive source in the predetermined scanning area and extended under tension along a scanning direction of said carriage,
wherein an intermediate portion of said wire is wound around said rotary member a predetermined number of times, and the ends of said wire extend under tension in opposite directions.

20. An information recording/reproducing apparatus according to claim 19, further comprising detection means for detecting a position of said carriage, wherein one part of said detection means is mounted on said carriage.

21. An information recording/reproducing apparatus according to claim 20, further comprising:
an electrical circuit that is fixed to an apparatus main body to drive or to control at least said detection means and said drive source; and
a flexible print board, one end of which is connected to said electrical circuit and the other end of which is connected to said detection means and said drive source.

22. An information recording/reproducing apparatus comprising:
a carriage capable of scanning in a predetermined scanning area, and constituting a mounting table on which an information recording head is mounted;
a drive source mounted on said carriage and movable with said carriage; and
wire wound around an output unit of said drive source in the predetermined scanning area and extended under tension along a scanning direction of said carriage, said wire not substantially moving in the scanning direction of said carriage during scanning of said carriage.

23. An information recording/reproducing apparatus according to claim 22, further comprising detection means for detecting a position of said carriage, wherein one part of said detection means is mounted on said carriage.

24. An information recording/reproducing apparatus according to claim 23, further comprising:
an electrical circuit that is fixed to an apparatus main body to drive or to control at least said detection means and said drive source; and
a flexible print board, one end of which is connected to said electrical circuit and the other end of which is connected to said detection means and said drive source.

25. An information recording/reproducing apparatus for recording/reproducing information on a recording medium, comprising:
a carriage capable of scanning in a predetermined scanning area and used to mount thereon a head for recording/reproducing;
a drive source mounted on said carriage and movable with said carriage; and
wire wound around an output unit of said drive source in the predetermined scanning area and extended under tension along a scanning direction of said carriage,
wherein said output unit around which said wire is wound moves along said wire upon being driven by said drive source to scan said carriage.

26. An information recording/reproducing apparatus according to claim 25, further comprising:
an electrical circuit that is fixed to an apparatus main body to drive or to control at least said head and said drive source; and
a flexible print board, one end of which is connected to said electrical circuit and the other end of which is connected to said recording/reproducing head and said drive source.

27. An information recording/reproducing apparatus for recording/reproducing information on a recording medium, comprising:
a carriage capable of scanning in a predetermined scanning area, and used to mount thereon a head for recording/reproducing;
a drive source mounted on said carriage and movable with said carriage, said drive source including at least a motor and a rotary member that is to be driven by said motor; and
wire wound around said rotary member of said drive source in the predetermined scanning area and extended under tension along a scanning direction of said carriage, wherein said wire encircles said rotary member an integer number of times.

28. An information recording/reproducing apparatus according to claim 27, further comprising:
   an electrical circuit that is fixed to an apparatus main body to drive or to control at least said head and said drive source; and
   a flexible print board, one end of which is connected to said electrical circuit and the other end of which is connected to said recording/reproducing head and said drive source.

29. An information recording/reproducing apparatus for recording/reproducing information on a recording medium, comprising:
   a carriage capable of scanning in a predetermined scanning area, and used to mount thereon a head for recording/reproducing;
   a drive source mounted on said carriage and movable with said carriage, said drive source including at least a motor and a rotary member to be driven by said motor; and
   wire wound around said rotary member of said drive source in the predetermined scanning area and extended under tension along a scanning direction of said carriage,
   wherein an intermediate portion of said wire is wound around said rotary member a predetermined number of times, and the ends of said wire extend under tension in opposite directions.

30. An information recording/reproducing apparatus according to claim 29, further comprising:
   an electrical circuit that is fixed to an apparatus main body to drive or to control at least said head and said drive source; and
   a flexible print board, one end of which is connected to said electrical circuit and the other end of which is connected to said recording/reproducing head and said drive source.

31. An information recording/reproducing apparatus for recording/reproducing information on a recording medium, comprising:
   a carriage capable of scanning in a predetermined scanning area, and used to mount thereon a head for recording/reproducing;
   a drive source mounted on said carriage and movable with said carriage; and
   wire wound around an output unit of said drive source in the predetermined scanning area and extended under tension along a scanning direction of said carriage, said wire not substantially moving in the scanning direction during scanning of said carriage.

32. An information recording/reproducing apparatus according to claim 31, further comprising:
   an electrical circuit that is fixed to an apparatus main body to drive or to control at least said head and said drive source; and
   a flexible print board, one end of which is connected to said electrical circuit and the other end of which is connected to said recording/reproducing head and said drive source.

33. An information recording apparatus for recording information on a recording medium, comprising:
   a carriage capable of scanning in a predetermined scanning area and used to mount thereon a recording head for recording information on the recording medium;
   a drive source mounted on said carriage and movable with said carriage; and
   wire wound around an output unit of said drive source in the predetermined scanning area and extended under tension along a scanning direction of said carriage,
   wherein said output unit around which said wire is wound moves along said wire upon being driven by said drive source to scan said carriage.

34. An information recording apparatus, which records information on a recording medium, comprising:
   a carriage capable of scanning in a predetermined scanning area, and used to mount thereon a recording head for recording information on the recording medium;
   a drive source mounted on said carriage and movable with said carriage, said drive source including at least a motor and a rotary member to be driven by said motor; and
   wire wound around said rotary member of said drive source in the predetermined scanning area and extended under tension along a scanning direction of said carriage,
   wherein said wire encircles said rotary member an integer number of times.

35. An information recording apparatus for recording information on a recording medium, comprising:
   a carriage capable of scanning in a predetermined scanning area, and used to mount thereon a recording head for recording information on the recording medium;
   a drive source mounted on said carriage and movable with said carriage, said drive source including at least a motor and a rotary member to be driven by said motor; and
   wire wound around said rotary member of said drive source in the predetermined scanning area and extended under tension along a scanning direction of said carriage,
   wherein an intermediate portion of said wire is wound around said rotary member a predetermined number of times, and the ends of said wire extend under tension in opposite directions.

36. An information recording apparatus for recording information on a recording medium, comprising:
   a carriage capable of scanning in a predetermined scanning area, and used to mount thereon a recording head for recording information on the recording medium;
   a drive source mounted on said carriage and movable with said carriage; and
   wire wound around an output unit of said drive source in the predetermined scanning area and extended under tension along a scanning direction of said carriage,
   wherein, during the scanning performed by said carriage, said wire substantially does not move in the direction in which said carriage is moving.

* * * * *

UNITED STATES PATENT AND TRADEMARK OFFICE
CERTIFICATE OF CORRECTION

PATENT NO. : 6,464,416 B1
DATED : October 15, 2002
INVENTOR(S) : Aoshima

It is certified that error appears in the above-identified patent and that said Letters Patent is hereby corrected as shown below:

Title page,
Item [56], References Cited, FOREIGN PATENT DOCUMENTS, "10-169330" should read -- 10-269330 --.

Signed and Sealed this

Third Day of June, 2003

JAMES E. ROGAN
*Director of the United States Patent and Trademark Office*